US006978159B2

(12) United States Patent
Feng et al.

(10) Patent No.: US 6,978,159 B2
(45) Date of Patent: Dec. 20, 2005

(54) BINAURAL SIGNAL PROCESSING USING MULTIPLE ACOUSTIC SENSORS AND DIGITAL FILTERING

(75) Inventors: Albert S. Feng, Champaign, IL (US); Chen Liu, Lisle, IL (US); Douglas L. Jones, Champaign, IL (US); Robert C. Bilger, Champaign, IL (US); Charissa R. Lansing, Champaign, IL (US); William D. O'Brien, Champaign, IL (US); Bruce C. Wheeler, Champaign, IL (US)

(73) Assignee: Board of Trustees of the University of Illinois, Champaign, IL (US)

(*) Notice: Subject to any disclaimer, the term of this patent is extended or adjusted under 35 U.S.C. 154(b) by 673 days.

(21) Appl. No.: 09/805,233

(22) Filed: Mar. 13, 2001

(65) Prior Publication Data

US 2001/0031053 A1 Oct. 18, 2001

Related U.S. Application Data

(63) Continuation of application No. PCT/US99/26965, filed on Nov. 16, 1999, which is a continuation-in-part of application No. 08/666,757, filed on Jun. 19, 1996, now Pat. No. 6,222,927.

(51) Int. Cl.[7] .................................................. H04B 1/00
(52) U.S. Cl. ................................... 455/570; 379/406.08
(58) Field of Search .............................. 455/569.1, 570, 455/569.2, 355, 132, 138; 381/313, 356; 379/420.01, 420.02–420.03, 406.01, 406.08

(56) References Cited

U.S. PATENT DOCUMENTS

| | | | | |
|---|---|---|---|---|
| 3,894,195 A | * | 7/1975 | Kryter ....................... | 381/23.1 |
| 4,025,721 A | | 5/1977 | Graupe et al. | |
| 4,207,441 A | | 6/1980 | Ricard et al. | |
| 4,304,235 A | | 12/1981 | Kaufman | |
| 4,334,740 A | | 6/1982 | Wray | |
| 4,354,064 A | | 10/1982 | Scott | |

(Continued)

FOREIGN PATENT DOCUMENTS

| | | |
|---|---|---|
| DE | 28 23 798 | 9/1979 |
| DE | 33 22 108 A1 | 12/1984 |

(Continued)

OTHER PUBLICATIONS

Capon, J., "High–Resolution Frequency–Wavenumber Spectrum Analysis", *Proceedings of the IEEE*, 57(8):1408–1419 (Aug. 1969).

(Continued)

*Primary Examiner*—Nick Corsaro
(74) *Attorney, Agent, or Firm*—Krieg DeVault LLP; L. Scott Paynter

(57) ABSTRACT

A desired acoustic signal is extracted from a noisy environment by generating a signal representative of the desired signal with processor (30). Processor (30) receives aural signals from two sensors (22, 24) each at a different location. The two inputs to processor (30) are converted from analog to digital format and then submitted to a discrete Fourier transform process to generate discrete spectral signal representations. The spectral signals are delayed to provide a number of intermediate signals, each corresponding to a different spatial location relative to the two sensors. Locations of the noise source and the desired source, and the spectral content of the desired signal are determined from the intermediate signal corresponding to the noise source locations. Inverse transformation of the selected intermediate signal followed by digital to analog conversion provides an output signal representative of the desired signal with output device (90). Techniques to localize multiple acoustic sources are also disclosed. Further, a technique to enhance noise reduction from multiple sources based on two-sensor reception is described.

39 Claims, 22 Drawing Sheets

U.S. PATENT DOCUMENTS 4,536,887 A * 8/1985 Kaneda et al. ................ 381/92
4,559,642 A 12/1985 Miyaji et al.
4,611,598 A 9/1986 Hortmann et al.
4,703,506 A 10/1987 Sakamoto et al.
4,742,548 A 5/1988 Sessler et al.
4,752,961 A 6/1988 Kohn
4,773,095 A 9/1988 Zwicker et al.
4,790,019 A 12/1988 Hueber
4,802,227 A * 1/1989 Elko et al. .................... 381/92
4,845,755 A 7/1989 Busch et al.
4,858,612 A 8/1989 Stocklin
4,918,737 A 4/1990 Luethi
4,982,434 A 1/1991 Lenhardt et al.
4,987,897 A 1/1991 Funke
4,988,981 A 1/1991 Zimmerman et al.
5,012,520 A 4/1991 Steeger
5,029,216 A 7/1991 Jhabvala et al.
5,040,156 A 8/1991 Föller
5,047,994 A 9/1991 Lenhardt et al.
5,113,859 A 5/1992 Funke
5,245,556 A 9/1993 Morgan et al.
5,259,032 A 11/1993 Perkins et al.
5,285,499 A 2/1994 Shannon et al.
5,289,544 A 2/1994 Franklin
5,321,332 A 6/1994 Toda
5,325,436 A 6/1994 Soli et al.
5,383,915 A 1/1995 Adams
5,400,409 A 3/1995 Linhard
5,417,113 A 5/1995 Hartley
5,430,690 A 7/1995 Abel
5,454,838 A 10/1995 Vallana et al.
5,463,694 A 10/1995 Bradley et al.
5,473,701 A 12/1995 Cezanne et al.
5,479,522 A 12/1995 Lindemann et al.
5,483,599 A * 1/1996 Zagorski ..................... 381/327
5,485,515 A 1/1996 Allen et al.
5,495,534 A 2/1996 Inanaga et al.
5,507,781 A 4/1996 Kroll et al.
5,511,128 A 4/1996 Lindemann
5,550,923 A 8/1996 Hotvet
5,602,962 A * 2/1997 Kellermann ................ 704/226
5,627,799 A 5/1997 Hoshuyama
5,651,071 A 7/1997 Lindemann et al.
5,663,727 A 9/1997 Vokac
5,694,474 A 12/1997 Ngo et al.
5,706,352 A 1/1998 Engebretson et al.
5,712,830 A * 1/1998 Ross et al. .................... 367/93
5,715,319 A 2/1998 Chu
5,721,783 A 2/1998 Anderson
5,734,976 A 3/1998 Bartschi et al.
5,737,430 A 4/1998 Widrow
5,755,748 A 5/1998 Borza
5,757,932 A 5/1998 Lindemann et al.
5,768,392 A 6/1998 Graupe
5,793,875 A 8/1998 Lehr et al.
5,825,898 A 10/1998 Marash
5,831,936 A 11/1998 Zlotnick et al.
5,833,603 A 11/1998 Kovacs et al.
5,878,147 A 3/1999 Killion et al.
5,889,870 A 3/1999 Norris
5,991,419 A 11/1999 Brander
6,002,776 A 12/1999 Bhadkamkar et al.
6,010,532 A 1/2000 Kroll et al.
6,023,514 A 2/2000 Strandberg
6,068,589 A 5/2000 Neukermans
6,094,150 A 7/2000 Ohnishi et al.
6,104,822 A 8/2000 Melanson et al.
6,118,882 A 9/2000 Haynes
6,137,889 A 10/2000 Shennib et al.
6,141,591 A 10/2000 Lenarz et al.
6,154,552 A 11/2000 Koroljow et al.
6,160,757 A 12/2000 Täger et al.
6,161,046 A 12/2000 Maniglia et al.
6,167,312 A 12/2000 Goedeke
6,173,062 B1 1/2001 Dibachi et al.
6,182,018 B1 1/2001 Tran et al.
6,192,134 B1 2/2001 White et al.
6,198,693 B1 3/2001 Marash
6,217,508 B1 4/2001 Ball et al.
6,222,927 B1 4/2001 Feng et al.
6,223,018 B1 4/2001 Fukumoto et al.
6,229,900 B1 5/2001 Leenen
6,243,471 B1 6/2001 Brandstein et al.
6,261,224 B1 7/2001 Adams et al.
6,272,229 B1 8/2001 Baekgaard
6,275,596 B1 8/2001 Fretz et al.
6,283,915 B1 9/2001 Aceti et al.
6,307,945 B1 10/2001 Hall
6,317,703 B1 11/2001 Linsker
6,327,370 B1 12/2001 Killion et al.
6,332,028 B1 12/2001 Marash
6,342,035 B1 1/2002 Kroll et al.
6,380,896 B1 4/2002 Berger et al.
6,385,323 B1 5/2002 Zoels
6,389,142 B1 5/2002 Hagen et al.
6,390,971 B1 5/2002 Adams et al.
6,397,186 B1 5/2002 Bush et al.
6,421,448 B1 7/2002 Arndt et al.
6,424,721 B1 7/2002 Hohn
2001/0036284 A1 11/2001 Leber
2001/0049466 A1 12/2001 Leysieffer et al.
2001/0051776 A1 12/2001 Lenhardt
2002/0012438 A1 1/2002 Leysieffer et al.
2002/0019668 A1 2/2002 Stockert et al.
2002/0029070 A1 3/2002 Leysieffer et al.
2002/0057817 A1 5/2002 Darbut
2002/0110255 A1 8/2002 Killion et al.
2002/0141595 A1 10/2002 Jouppi

FOREIGN PATENT DOCUMENTS

DE 195 41 648 C2 5/2000
EP 0 802 699 10/1997
EP 0 824 889 A1 2/1998
WO WO 98/26629 6/1998
WO WO 98/56459 12/1998
WO WO 00/30404 5/2000
WO WO 01/06851 2/2001
WO WO 01/87011 11/2001

OTHER PUBLICATIONS

Griffiths, Lloyd J. and Jim, Charles W., "An Alternative Approach to Linearly Constrained Adaptive Beamforming", *Transactions on Antennas and Propagation*, AP–30(1):27–34 (Jan. 1982).

Hoffman, M.W.; Trine, T.D.; Buckley, K.M. and Van Tasell, D.J. "Robust adaptive micorphone array processing for hearing aids: Realistic speech enhancement", *The Journal of the Acoustical Society of America*, 96(2)(1):759–770 (Aug. 1994).

Kollmeier, Birger; Peissig, Jürgen and Hohmann, Volker, Real–time multiband dynamic compression and noise reduction for binaural hearing aids, *Journal of Rehabilitiation Research and Development*, 30(1):82–94 (1993).

Lindemann, W. , "Extension of a binaural cross–correlation model by contralateral inhibition. I. Simulation of lateralization for stationary signals", *The Journal of the Acoustical Society of America*, 80(6):1608–1622 (Dec. 1986).

Link, Michael J. and Buckley, Kevin M., Prewhitering for intelligibility gain in hearing aid arrays, *The Journal of the Acoustical Society of America*, 93(4)(1):2139–2145 (Apr. 1993).

Peissig, Jürgen and Kollmeier, Birger, "Directivity of binaural noise reduction in spatial multiple noise–source arrangements for normal and impaired listeners", *The Journal of the Acoustical Society of America*, 101(3):1660–1670 (Mar. 1997).

Soede, Wim; Berkhout, J. and Bilsen, Frans A., "Development of a directional hearing instrument based on array technology", *The Journal of the Acoustical Society of America*, 94(2)(1):785–798 (Aug. 1993).

Stadler, R.W. and Rabinowitz, W.M., "On the potential of fixed arrays for hearing aids", *The Journal of the Acoustical Society of America*, 94(3)(1):1332–1342 (Sep. 1993).

Zimmerman, T.G., "Personal Area Networks: Near–field intrabody communication", *IBM Systems Journal*, 35(3, 4):609–617 (1996).

Tichavsky P., Wong K., and Zoltowski M., "Near–Field/Far–Field Azimuth and Elevation Angle Estimation Using a Single Vector Hydrophone", *IEEE Transactions on Signal Processing*, vol. 49, No. 11, Nov. 2001.

Otis Lamont Frost, III, "*An Algorithm for Linearly Constrained Adaptive Array Proceeding*", Proceedings of the IEEE, vol., 60, No. 8, Stanford University, Stanford, CA, Aug. 1997.

D. Banks, "*Localisation and Separation of Simultaneous Voices With Two Microphones*", IEEE Proceedings, vol. 140, No. 4, Aug. 1994.

Markus Bodden, "*Modeling Human Sound–Source Localization and the Cocktail–Party–Effect*", Acta Acustica 1, 43–55, 1993.

T.G. Zimmerman, *Personal Area Networks: Near–field intrabody communication*, IBM Systems Journal, vol. 35, Nos. 3&4, 1996.

Nathaniel A. Whitman[1], Janet C. Rutledge[1], and Jonathan Cohen,[2] "*Reducing Correlated Noise in Digital Hearing Aids*", IEEE Engineering in Medicine and Biology, Sep./Oct. 1996.

M. Bodden, "*Auditory Demonstrations of a Cocktail–Party–Processor*", Acta Acustica vol. 82, 356–357, 1996.

* cited by examiner

| TEST # | DESIRED SOURCE | INTELLIGIBILITY-WEIGHTED SIGNAL CANCELLATION (dB) | | | | INTELLIGIBILITY-WEIGHTED NOISE CANCELLATION (dB) | NET INTELLIGIBILITY-WEIGHTED GAIN (dB) |
|---|---|---|---|---|---|---|---|
| | | M1 "armchair" | M2 "playground" | F1 "pancake" | F2 "woodwork" | | |
| #1 | | -75 | 0 | 20 | 75 | | |
| | -75 | 0.22 | 5.27 | 5.43 | 5.19 | 8.09 | 7.86 |
| | 0 | 7.94 | -0.00 | 5.39 | 3.61 | 9.40 | 9.40 |
| | 20 | 8.24 | 3.63 | -0.02 | 4.27 | 9.03 | 9.05 |
| | 75 | 8.37 | 4.69 | 5.17 | 0.05 | 10.16 | 10.11 |
| #2 | | 30 | -45 | 60 | -10 | | |
| | 30 | 0.01 | 5.56 | 4.62 | 5.88 | 8.25 | 8.24 |
| | -45 | 10.43 | 0.04 | 5.67 | 5.63 | 10.31 | 10.27 |
| | 60 | 11.24 | 5.56 | 0.06 | 5.70 | 10.65 | 10.59 |
| | -10 | 9.32 | 4.29 | 3.51 | -0.06 | 9.52 | 9.59 |
| #3 | | 10 | -80 | -50 | 45 | | |
| | 10 | 0.01 | 4.88 | 5.25 | 3.05 | 7.79 | 7.78 |
| | -80 | 10.00 | 0.15 | 5.53 | 3.29 | 10.66 | 10.52 |
| | -50 | 10.10 | 2.99 | 0.03 | 3.39 | 9.54 | 9.51 |
| | 45 | 10.77 | 5.41 | 6.44 | 0.07 | 11.72 | 11.66 |
| #4 | | -30 | 15 | 5 | -60 | | |
| | -30 | 0.02 | 6.11 | 6.14 | 4.87 | 8.48 | 8.46 |
| | 15 | 9.55 | -0.02 | 5.25 | 4.40 | 10.22 | 10.24 |
| | 5 | 9.24 | 2.99 | -0.01 | 3.95 | 9.65 | 9.66 |
| | -60 | 9.97 | 5.68 | 6.73 | 0.03 | 11.16 | 11.13 |
| #5 | | -25 | 25 | -70 | 80 | | |
| | -25 | 0.02 | 5.86 | 4.78 | 4.73 | 8.09 | 8.07 |
| | 25 | 9.07 | -0.01 | 4.98 | 3.51 | 9.39 | 9.40 |
| | -70 | 10.09 | 4.66 | 0.08 | 4.31 | 9.99 | 9.91 |
| | 80 | 9.40 | 4.90 | 4.61 | 0.02 | 10.27 | 10.25 |

TABLE I

*Fig. 19*

| TEST # | DESIRED SOURCE | INTELLIGIBILITY-WEIGHTED SIGNAL CANCELLATION (dB) M1 "armchair" | M2 "playground" | F1 "pancake" | F2 "woodwork" | INTELLIGIBILITY-WEIGHTED NOISE CANCELLATION (dB) | NET INTELLIGIBILITY-WEIGHTED GAIN (dB) |
|---|---|---|---|---|---|---|---|
| #1 | | -75 | 0 | 20 | 75 | | |
| | -75 | 0.13 | 5.36 | 5.91 | 5.93 | 8.45 | 8.32 |
| | 0 | 8.10 | 0.00 | 5.20 | 4.09 | 9.71 | 9.71 |
| | 20 | 8.28 | 3.43 | -0.01 | 4.76 | 9.16 | 9.18 |
| | 75 | 8.36 | 4.49 | 5.15 | 0.04 | 10.32 | 10.28 |
| #2 | | 30 | -45 | 60 | -10 | | |
| | 30 | 0.01 | 5.50 | 4.61 | 5.79 | 8.22 | 8.20 |
| | -45 | 10.48 | 0.04 | 5.67 | 5.54 | 10.31 | 10.28 |
| | 60 | 11.21 | 5.56 | 0.07 | 5.63 | 10.66 | 10.59 |
| | -10 | 9.28 | 4.25 | 3.44 | -0.07 | 9.53 | 9.60 |
| #3 | | 10 | -80 | -50 | 45 | | |
| | 10 | 0.05 | 5.06 | 4.83 | 3.17 | 7.90 | 7.85 |
| | -80 | 9.82 | 0.10 | 5.59 | 3.63 | 10.85 | 10.76 |
| | -50 | 9.48 | 3.60 | 0.06 | 3.31 | 10.15 | 10.09 |
| | 45 | 10.51 | 5.47 | 6.38 | 0.05 | 11.95 | 11.90 |
| #4 | | -30 | 15 | 5 | -60 | | |
| | -30 | 0.02 | 6.11 | 6.13 | 5.11 | 8.56 | 8.53 |
| | 15 | 9.53 | -0.00 | 5.31 | 4.33 | 10.25 | 10.25 |
| | 5 | 9.18 | 2.95 | -0.00 | 4.01 | 9.55 | 9.56 |
| | -60 | 9.70 | 5.33 | 6.07 | 0.01 | 10.92 | 10.91 |
| #5 | | -25 | 25 | -70 | 80 | | |
| | -25 | 0.01 | 5.82 | 4.96 | 5.37 | 8.24 | 8.24 |
| | 25 | 8.77 | -0.00 | 5.19 | 4.29 | 9.43 | 9.43 |
| | -70 | 9.77 | 4.85 | 0.05 | 4.74 | 10.18 | 10.13 |
| | 80 | 9.02 | 4.58 | 4.73 | -0.00 | 10.38 | 10.39 |

TABLE II

*Fig. 20*

| TEST # | DESIRED SOURCE | INTELLIGIBILITY-WEIGHTED SIGNAL CANCELLATION (dB) F3 "stairway" | F4 "mushroom" | M3 "birthday" | M4 "sidewalk" | INTELLIGIBILITY-WEIGHTED NOISE CANCELLATION (dB) | NET INTELLIGIBILITY-WEIGHTED GAIN (dB) |
|---|---|---|---|---|---|---|---|
| #1 | | -75 | 0 | 20 | 75 | | |
| | -75 | 0.09 | 8.47 | 7.85 | 6.17 | 9.51 | 9.42 |
| | 0 | 5.69 | -0.01 | 6.45 | 5.38 | 8.30 | 8.31 |
| | 20 | 6.12 | 7.33 | -0.03 | 5.09 | 9.65 | 9.69 |
| | 75 | 7.34 | 8.62 | 8.24 | 0.08 | 11.03 | 10.95 |
| #2 | | 30 | -45 | 60 | -10 | | |
| | 30 | 0.01 | 8.04 | 6.31 | 6.63 | 9.24 | 9.22 |
| | -45 | 7.48 | 0.13 | 6.05 | 6.06 | 9.02 | 8.89 |
| | 60 | 7.78 | 8.52 | 0.10 | 6.85 | 10.51 | 10.41 |
| | -10 | 7.86 | 7.53 | 6.65 | -0.03 | 10.02 | 10.05 |
| #3 | | 10 | -80 | -50 | 45 | | |
| | 10 | -0.11 | 5.96 | 6.32 | 6.99 | 7.48 | 7.59 |
| | -80 | 6.06 | 0.11 | 5.86 | 6.74 | 9.11 | 9.00 |
| | -50 | 6.71 | 4.33 | 0.06 | 7.18 | 7.95 | 7.88 |
| | 45 | 7.07 | 6.42 | 6.78 | 0.05 | 8.98 | 8.93 |
| #4 | | -30 | 15 | 5 | -60 | | |
| | -30 | 0.02 | 8.37 | 8.24 | 5.70 | 9.33 | 9.31 |
| | 15 | 6.56 | 0.02 | 6.51 | 5.81 | 8.87 | 8.85 |
| | 5 | 6.30 | 5.27 | 0.01 | 5.68 | 8.77 | 8.76 |
| | -60 | 7.61 | 8.22 | 8.41 | 0.05 | 10.64 | 10.58 |
| #5 | | -25 | 25 | -70 | 80 | | |
| | -25 | 0.00 | 7.68 | 6.67 | 6.50 | 9.75 | 9.74 |
| | 25 | 6.14 | -0.03 | 6.03 | 4.46 | 8.20 | 8.22 |
| | -70 | 5.60 | 6.54 | 0.22 | 4.58 | 9.05 | 8.83 |
| | 80 | 6.85 | 7.42 | 6.12 | 0.08 | 9.91 | 9.84 |

TABLE III

*Fig. 21*

| TEST # | DESIRED SOURCE | INTELLIGIBILITY-WEIGHTED SIGNAL CANCELLATION (dB) F3 "stairway" | F4 "mushroom" | M3 "birthday" | M4 "sidewalk" | INTELLIGIBILITY-WEIGHTED NOISE CANCELLATION (dB) | NET INTELLIGIBILITY-WEIGHTED GAIN (dB) |
|---|---|---|---|---|---|---|---|
| #1 | | -75 | 0 | 20 | 75 | | |
| | -75 | 0.11 | 6.41 | 6.78 | 7.15 | 8.17 | 8.06 |
| | 0 | 5.68 | 0.00 | 5.12 | 6.26 | 8.30 | 8.30 |
| | 20 | 6.10 | 5.82 | -0.03 | 6.17 | 8.39 | 8.42 |
| | 75 | 7.40 | 6.04 | 6.60 | 0.09 | 8.44 | 8.35 |
| #2 | | 30 | -45 | 60 | -10 | | |
| | 30 | 0.02 | 8.06 | 6.07 | 6.41 | 9.16 | 9.14 |
| | -45 | 7.55 | 0.11 | 5.63 | 6.65 | 9.05 | 8.95 |
| | 60 | 7.47 | 8.48 | 0.08 | 6.64 | 10.55 | 10.47 |
| | -10 | 7.57 | 7.60 | 6.31 | -0.04 | 10.04 | 10.07 |
| #3 | | 10 | -80 | -50 | 45 | | |
| | 10 | -0.11 | 5.94 | 3.79 | 6.87 | 6.41 | 6.52 |
| | -80 | 6.30 | 0.10 | 4.04 | 6.56 | 8.07 | 7.97 |
| | -50 | 6.69 | 4.68 | 0.07 | 6.89 | 8.29 | 8.22 |
| | 45 | 7.16 | 6.07 | 4.94 | 0.03 | 8.02 | 7.99 |
| #4 | | -30 | 15 | 5 | -60 | | |
| | -30 | 0.02 | 8.45 | 7.08 | 6.18 | 9.10 | 9.08 |
| | 15 | 7.18 | 0.00 | 5.07 | 6.31 | 8.02 | 8.02 |
| | 5 | 6.27 | 5.21 | 0.03 | 5.47 | 8.66 | 8.64 |
| | -60 | 7.89 | 8.34 | 7.19 | 0.05 | 10.35 | 10.30 |
| #5 | | -25 | 25 | -70 | 80 | | |
| | -25 | 0.01 | 7.79 | 6.63 | 6.57 | 9.67 | 9.66 |
| | 25 | 6.08 | -0.03 | 5.90 | 4.82 | 8.25 | 8.28 |
| | -70 | 5.58 | 6.66 | 0.15 | 4.43 | 9.18 | 9.03 |
| | 80 | 6.67 | 7.63 | 5.87 | 0.07 | 9.81 | 9.74 |

TABLE IV

*Fig. 22*

BINAURAL SIGNAL PROCESSING USING MULTIPLE ACOUSTIC SENSORS AND DIGITAL FILTERING

This application is a continuation of commonly owned International Patent Application Number PCT/US99/26965 filed 16 Nov. 1999, which is a continuation-in-part of commonly owned, U.S. patent application Ser. No. 08/666,757, filed on 19 Jun. 1996, now U.S. Pat. No. 6,222,927 to Feng et al., and entitled BINAURAL SIGNAL PROCESSING SYSTEM AND METHOD.

BACKGROUND OF THE INVENTION

The present invention is directed to the processing of acoustic signals, and more particularly, but not exclusively, relates to the localization and extraction of acoustic signals emanating from different sources.

The difficulty of extracting a desired signal in the presence of interfering signals is a longstanding problem confronted by acoustic engineers. This problem impacts the design and construction of many kinds of devices such as systems for voice recognition and intelligence gathering. Especially troublesome is the separation of desired sound from unwanted sound with hearing aid devices. Generally, hearing aid devices do not permit selective amplification of a desired sound when contaminated by noise from a nearby source—particularly when the noise is more intense. This problem is even more severe when the desired sound is a speech signal and the nearby noise is also a speech signal produced by multiple talkers (e.g. babble). As used herein, "noise" refers to random or nondeterministic signals and alternatively or additionally refers to any undesired signals and/or any signals interfering with the perception of a desired signal.

One attempted solution to this problem has been the application of a single, highly directional microphone to enhance directionality of the hearing aid receiver. This approach has only a very limited capability. As a result, spectral subtraction, comb filtering, and speech-production modeling have been explored to enhance single microphone performance. Nonetheless, these approaches still generally fail to improve intelligibility of a desired speech signal, particularly when the signal and noise sources are in close proximity.

Another approach has been to arrange a number of microphones in a selected spatial relationship to form a type of directional detection beam. Unfortunately, when limited to a size practical for hearing aids, beam forming arrays also have limited capacity to separate signals that are close together—especially if the noise is more intense than the desired speech signal. In addition, in the case of one noise source in a less reverberant environment, the noise cancellation provided by the beam-former varies with the location of the noise source in relation to the microphone array. R. W. Stadler and W. M. Rabinowitz, *On the Potential of Fixed Arrays for Hearing Aids,* 94 Journal Acoustical Society of America 1332 (September 1993), and W. Soede et al., *Development of a Directional Hearing Instrument Based on Array Technology,* 94 Journal of Acoustical Society of America 785 (August 1993) are cited as additional background concerning the beamforming approach.

Still another approach has been the application of two microphones displaced from one another to provide two signals to emulate certain aspects of the binaural hearing system common to humans and many types of animals. Although certain aspects of biologic binaural hearing are not fully understood, it is believed that the ability to localize sound sources is based on evaluation by the auditory system of binaural time delays and sound levels across different frequency bands associated with each of the two sound signals. The localization of sound sources with systems based on these interaural time and intensity differences is discussed in W. Lindemann, *Extension of a Binaural Cross-Correlation Model by Contralateral Inhibition—I. Simulation of Lateralization for Stationary Signals,* 80 Journal of the Acoustical Society of America 1608 (December 1986).

The localization of multiple acoustic sources based on input from two microphones presents several significant challenges, as does the separation of a desired signal once the sound sources are localized. For example, the system set forth in Markus Bodden, *Modeling Human Sound-Source Localization and the Cocktail-Party-Effect,* 1 Acta Acustica 43 (February/April 1993) employs a Wiener filter including a windowing process in an attempt to derive a desired signal from binaural input signals once the location of the desired signal has been established. Unfortunately, this approach results in significant deterioration of desired speech fidelity. Also, the system has only been demonstrated to suppress noise of equal intensity to the desired signal at an azimuthal separation of at least 30 degrees. A more intense noise emanating from a source spaced closer than 30 degrees from the desired source continues to present a problem. Moreover, the proposed algorithm of the Bodden system is computationally intense—posing a serious question of whether it can be practically embodied in a hearing aid device.

Another example of a two microphone system is found in D. Banks, *Localisation and Separation of Simultaneous Voices with Two Microphones*, IEE Proceedings-I, 140 (1993). This system employs a windowing technique to estimate the location of a sound source when there are nonoverlapping gaps in its spectrum compared to the spectrum of interfering noise. This system cannot perform localization when wide-band signals lacking such gaps are involved. In addition, the Banks article fails to provide details of the algorithm for reconstructing the desired signal. U.S. Pat. No. 5,479,522 to Lindemann et al.; U.S. Pat. No. 5,325,436 to Soli et al.; U.S. Pat. No. 5,289,544 to Franklin; and U.S. Pat. No. 4,773,095 to Zwicker et al. are cited as sources of additional background concerning dual microphone hearing aid systems.

Effective localization is also often hampered by ambiguous positional information that results above certain frequencies related to the spacing of the input microphones. This problem was recognized in Stem, R. M., Zeiberg, A. S., and Trahiotis, C. "*Lateralization of complex binaural stimuli: A weighted-image model,*" *J. Acoust. Soc. Am.* 84, 156–165 (1988).

Thus, a need remains for more effective localization and extraction techniques—especially for use with binaural systems. The present invention meets these needs and offers other significant benefits and advantages.

SUMMARY OF THE INVENTION

The present invention relates to the processing of acoustic signals. Various aspects of the invention are novel, nonobvious, and provide various advantages. While the actual nature of the invention covered herein can only be determined with reference to the claims appended hereto, selected forms and features of the preferred embodiments as disclosed herein are described briefly as follows.

One form of the present invention includes a unique signal processing technique for localizing and characterizing each of a number of differently located acoustic sources. This form may include two spaced apart sensors to detect acoustic output from the sources. Each, or one particular selected source may be extracted, while suppressing the output of the other sources. A variety of applications may benefit from this technique including hearing aids, sound location mapping or tracking devices, and voice recognition equipment, to name a few.

In another form, a first signal is provided from a first acousticsensor and a second signal from a second acoustic sensor spaced apart from the first acoustic sensor. The first and second signals each correspond to a composite of two or more acoustic sources that, in turn, include a plurality of interfering sources and a desired source. The interfering sources are localized by processing of the first and second signals to provide a corresponding number of interfering source signals. These signals each include a number of frequency components. One or more the frequency components are suppressed for each of the interfering source signals. This approach facilitates nulling a different frequency component for each of a number of noise sources with two input sensors.

A further form of the present invention is a processing system having a pair of sensors and a delay operator responsive to a pair of input signals from the sensors to generate a number of delayed signals therefrom. The system also has a localization operator responsive to the delayed signals to localize the interfering sources relative to the location of the sensors and provide a plurality of interfering source signals each represented by a number of frequency components. The system further includes an extraction operator that serves to suppress selected frequency components for each of the interfering source signals and extract a desired signal corresponding to a desired source. An output device responsive to the desired signal is also included that provides an output representative of the desired source. This system may be incorporated into a signal processor coupled to the sensors to facilitate localizing and suppressing multiple noise sources when extracting a desired signal.

Still another form is responsive to position-plus-frequency attributes of sound sources. It includes positioning a first acoustic sensor and a second acoustic sensor to detect a plurality of differently located acoustic sources. First and second signals are generated by the first and second sensors, respectively, that receive stimuli from the acoustic sources. A number of delayed signal pairs are provided from the first and second signals that each correspond to one of a number of positions relative to the first and second sensors. The sources are localized as a function of the delayed signal pairs and a number of coincidence patterns. These patterns are position and frequency specific, and may be utilized to recognize and correspondingly accumulate position data estimates that map to each true source position. As a result, these patterns may operate as filters to provide better localization resolution and eliminate spurious data.

In yet another form, a system includes two sensors each configured to generate a corresponding first or second input signal and a delay operator responsive to these signals to generate a number of delayed signals each corresponding to one of a number of positions relative to the sensors. The system also includes a localization operator responsive to the delayed signals for determining the number of sound source localization signals. These localization signals are determined from the delayed signals and a number of coincidence patterns that each correspond to one of the positions. The patterns each relate frequency varying sound source location information caused by ambiguous phase multiples to a corresponding position to improve acoustic source localization. The system also has an output device responsive to the localization signals to provide an output corresponding to at least one of the sources.

A further form utilizes two sensors to provide corresponding binaural signals from which the relative separation of a first acoustic source from a second acoustic source may be established as a function of time, and the spectral content of a desired acoustic signal from the first source may be representatively extracted. Localization and identification of the spectral content of the desired acoustic signal may be performed concurrently. This form may also successfully extract the desired acoustic signal even if a nearby noise source is of greater relative intensity.

Another form of the present invention employs a first and second sensor at different locations to provide a binaural representation of an acoustic signal which includes a desired signal emanating from aselected source and interfering signals emanating from several interfering sources. A processor generates a discrete first spectral signal and a discrete second spectral signal from the sensor signals. The processor delays the first and second spectral signals by a number of time intervals to generate a number of delayed first signals and a number of delayed second signals and provide a time increment signal. The time increment signal corresponds to separation of the selected source from the noise source. The processor generates an output signal as a function of the time increment signal, and an output device responds to the output signal to provide an output representative of the desired signal.

An additional form includes positioning a first and second sensor relative to a first signal source with the first and second sensor being spaced apart from each other and a second signal source being spaced apart from the first signal source. A first signal is provided from the first sensor and a second signal is provided from the second sensor. The first and second signals each represents a composite acoustic signal including a desired signal from the first signal source and unwanted signals from other sound sources. A number of spectral signals are established from the first and second signals as functions of a number of frequencies. A member of the spectral signals representative of position of the second signal source is determined, and an output signal is generated from the member which is representative of the first signal source. This feature facilitates extraction of a desired signal from a spectral signal determined as part of the localization of the interfering source. This approach can avoid the extensive post-localization computations required by many binaural systems to extract a desired signal.

Accordingly, it is one object of the present invention to provide for the enhanced localization of multiple acoustic sources.

It is another object to extract a desired acoustic signal from a noisy environment caused by a number of interfering sources.

An additional object is to provide a system for the localization and extraction of acoustic signals by detecting a combination of these signals with two differently located sensors.

Further embodiments, objects, features, aspects, benefits, forms, and advantages of the present invention shall become apparent from the detailed drawings and descriptions provided herein.

BRIEF DESCRIPTION OF THE DRAWINGS

FIGS. 19–22 are tables depicting experimental results obtained with the present invention.

DESCRIPTION OF THE SELECTED EMBODIMENTS

Figure 1:
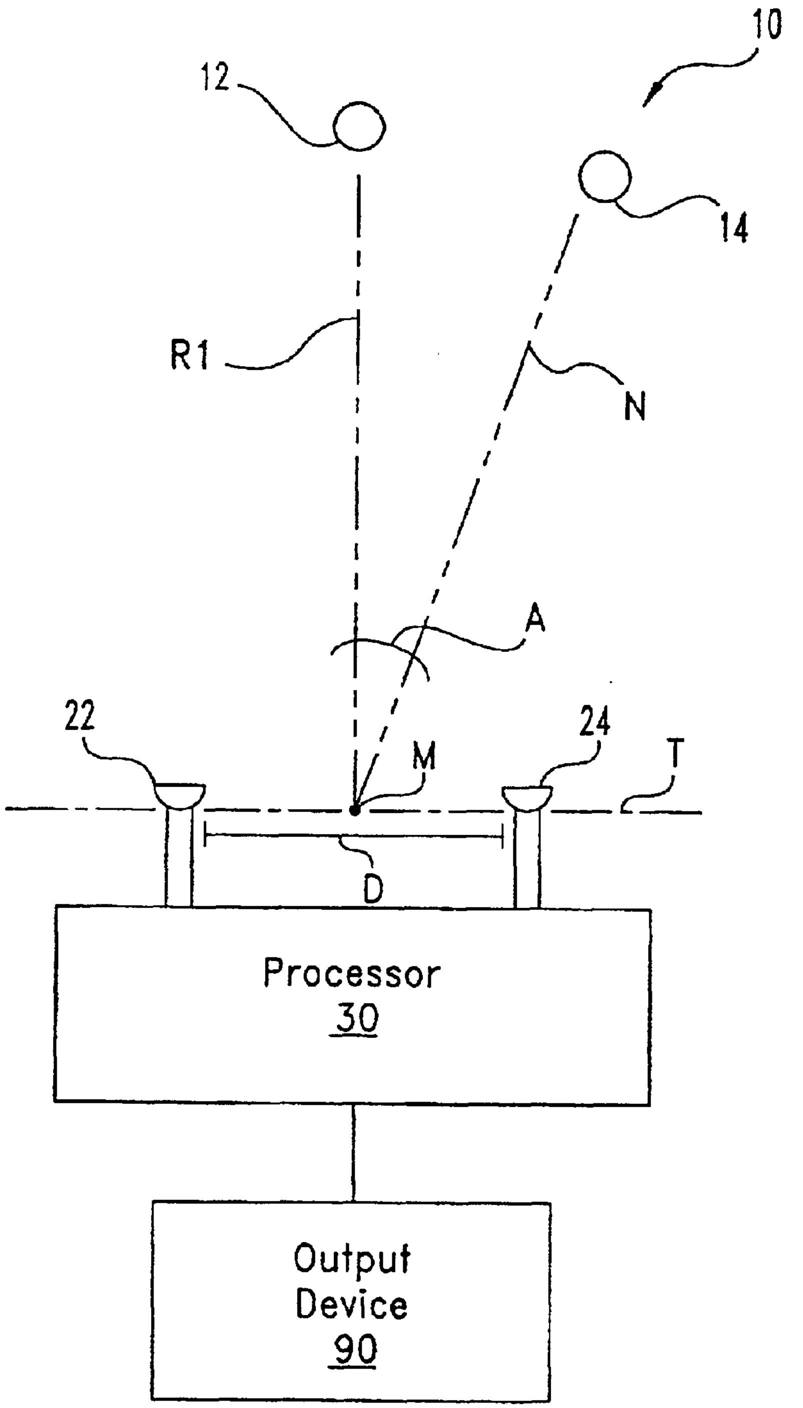
FIG. 1 is a diagrammatic view of a system of one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 illustrates an acoustic signal processing system 10 of one embodiment of the present invention. System 10 is configured to extract a desired acoustic signal from source 12 despite interference or noise emanating from nearby source 14. System 10 includes a pair of acoustic sensors 22, 24 configured to detect acoustic excitation that includes signals from sources 12, 14. Sensors 22, 24 are operatively coupled to processor 30 to process signals received therefrom. Also, processor 30 is operatively coupled to output device 90 to provide a signal representative of a desired signal from source 12 with reduced interference from source 14 as compared to composite acoustic signals presented to sensors 22, 24 from sources 12, 14.

Sensors 22, 24 are spaced apart from one another by distance D along lateral axis T. Midpoint M represents the half way point along distance D from sensor 22 to sensor 24. Reference axis R1 is aligned with source 12 and intersects axis T perpendicularly through midpoint M. Axis N is aligned with source 14 and also intersects midpoint M. Axis N is positioned to form angle A with reference axis R1. FIG. 1 depicts an angle A of about 20 degrees. Notably, reference axis R1 may be selected to define a reference azimuthal position of zero degrees in an azimuthal plane intersecting sources 12, 14; sensors 22, 24; and containing axes T, N, R1. As a result, source 12 is "on-axis" and source 14, as aligned with axis N, is "off-axis." Source 14 is illustrated at about a 20 degree azimuth relative to source 12.

Preferably sensors 22, 24 are fixed relative to each other and configured to move in tandem to selectively position reference axis R1 relative to a desired acoustic signal source. It is also preferred that sensors 22, 24 be microphones of a conventional variety, such as omnidirectional dynamic microphones. In other embodiments, a different sensor type may be utilized as would occur to one skilled in the art.

Figure 2:
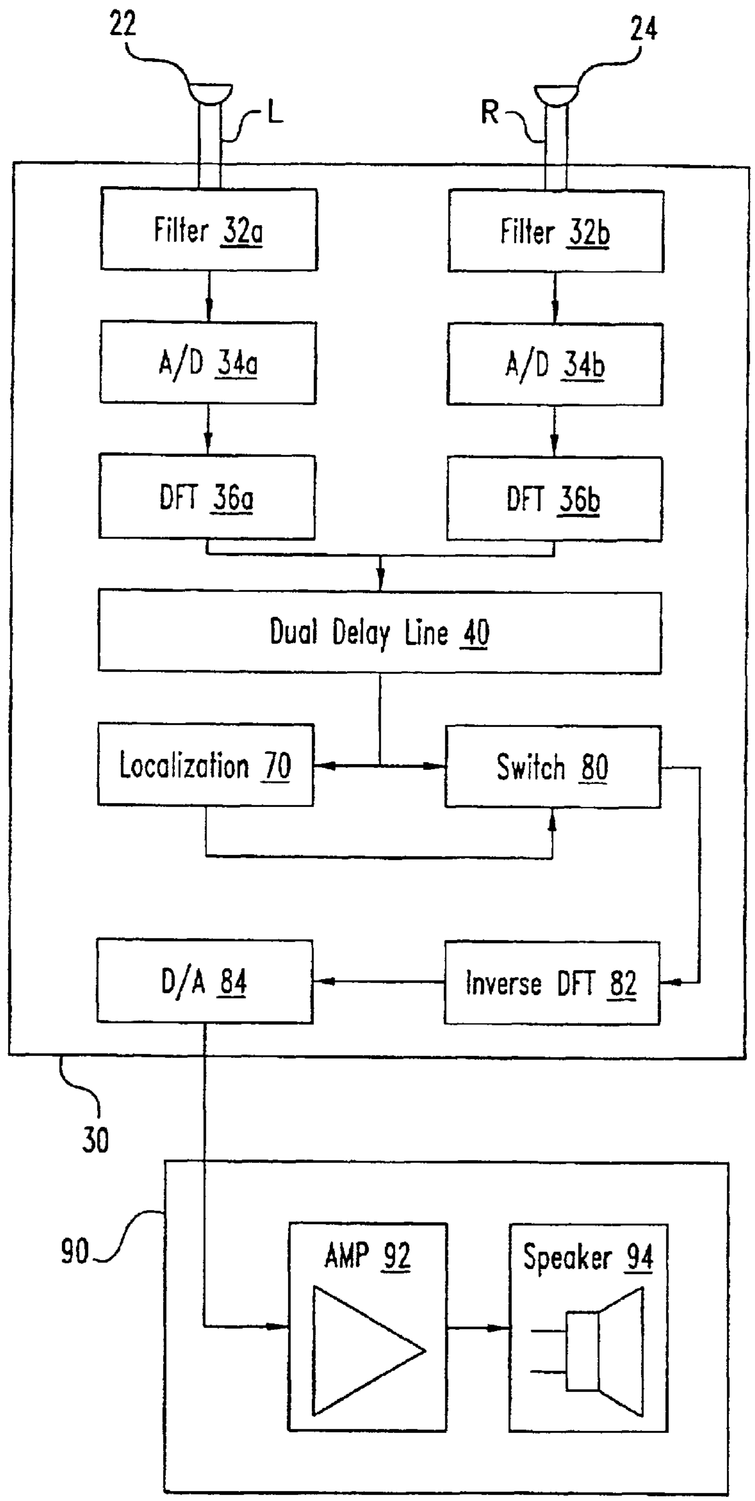
FIG. 2 is a signal flow diagram flrther depicting selected aspects of the system of FIG. 1.

Referring additionally to FIG. 2, a signal flow diagram illustrates various processing stages for the embodiment shown in FIG. 1. Sensors 22, 24 provide analog signals Lp(t) and Rp(t) corresponding to the left sensor 22, and right sensor 24, respectively. Signals Lp(t) and Rp(t) are initially input to processor 30 in separate processing channels L and R. For each channel L, R, signals Lp(t) and Rp(t) are conditioned and filtered in stages 32*a*, 32*b* to reduce aliasing, respectively. After filter stages 32*a*, 32*b*, the conditioned signals Lp(t), Rp(t) are input to corresponding Analog to Digital (A/D) converters 34*a*, 34*b* to provide discrete signals Lp(k), Rp(k), where k indexes discrete sampling events. In one embodiment, A/D stages 34*a*, 34*b* sample signals Lp(t) and Rp(t) at a rate of at least twice the frequency of the upper end of the audio frequency range to assure a high fidelity representation of the input signals.

Discrete signals Lp(k) and Rp(k) are transformed from the time domain to the frequency domain by a short-term Discrete Fourier Transform (DFT) algorithm in stages 36*a*, 36*b* to provide complex-valued signals XLp(m) and XRp (m). Signals XLp(m) and XRp(m) 45 are evaluated in stages 36*a*, 36*b* at discrete frequencies $f_m$, where m is an index (m=1 to m=M) to discrete frequencies, and index p denotes the short-term spectral analysis time frame. Index p is arranged in reverse chronological order with the most recent time frame being p=1, the next most recent time frame being p=2, and so forth. Preferably, frequencies M encompass the audible frequency range and the number of samples employed in the short-term analysis is selected to strike an optimum balance between processing speed limitations and desired resolution of resulting output signals. In one embodiment, an audio range of 0.1 to 6 kHz is sampled in A/D stages 34*a*, 34*b* at a rate of at least 12.5 kHz with 512 samples per short-term spectral analysis time frame. In alternative embodiments, the frequency domain analysis may be provided by an analog filter bank employed before A/D stages 34*a*, 34*b*. It should be understood that the spectral signals XLp(m) and XRp(m) may be represented as arrays each having a 1×M dimension corresponding to the different frequencies $f_m$.

Figure 3:
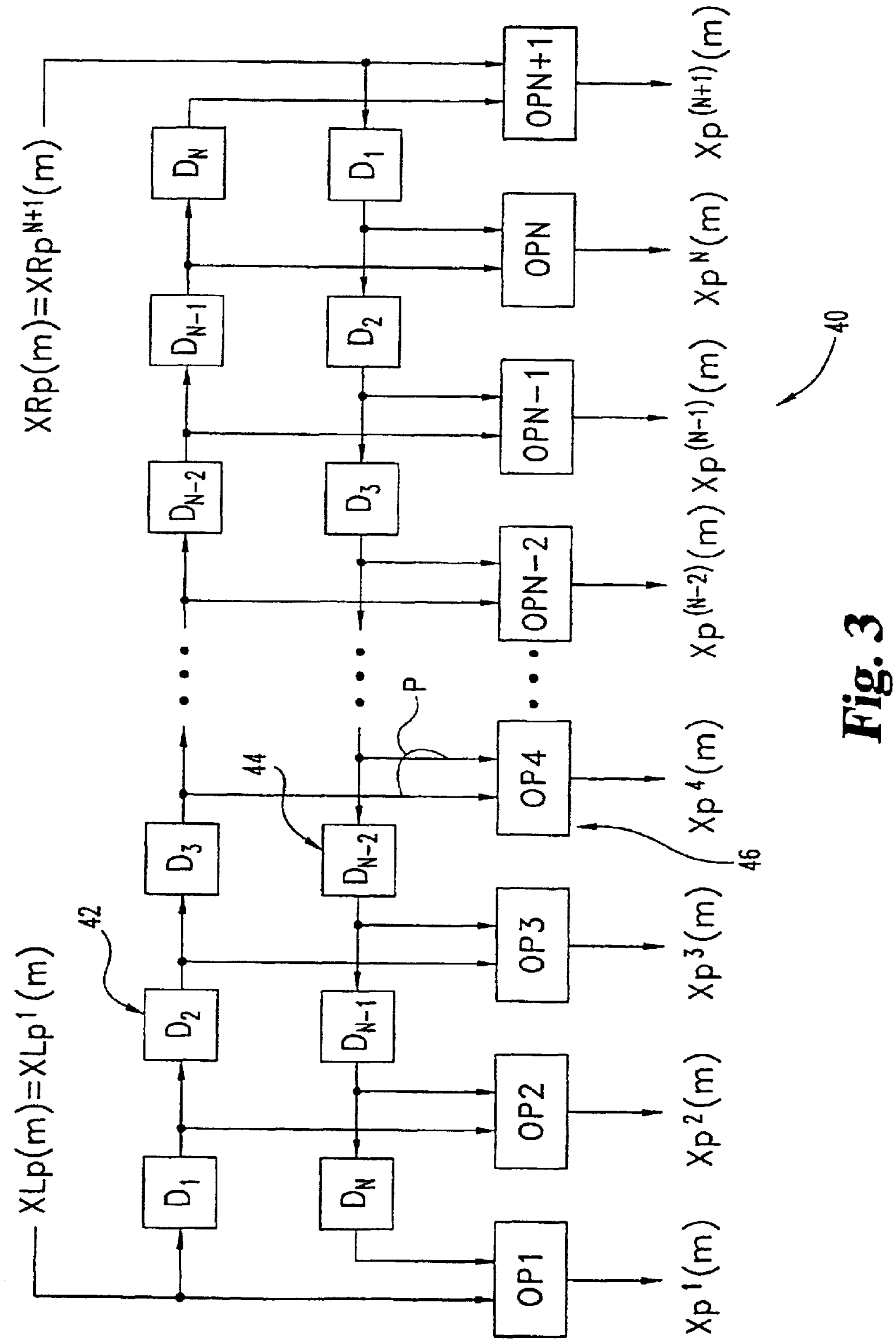
FIG. 3 is schematic representation of the dual delay line of FIG. 2.

Spectral signals XLp(m) and XRp(m) are input to dual delay line 40 as further detailed in FIG. 3. FIG. 3 depicts two delay lines 42, 44 each having N number of delay stages. Each delay line 42, 44 is sequentially configured with delay stages $D_1$ through $D_N$. Delay lines 42, 44 are configured to delay corresponding input signals in opposing directions from one delay stage to the next, and generally correspond to the dual hearing channels associated with a natural binaural hearing process. Delay stages $D_1$, $D_2$, $D_3$, . . . , $D_{N-2}$, $D_{N-1}$, and $D_N$ each delay an input signal by corresponding time delay increments $\tau_1$, $\tau_2$, $\tau_3$, . . . , $\tau_{N-2}$, $\tau_{N-1}$, and $\tau_N$, (collectively designated $\tau_i$), where index i goes from left to right. For delay line 42, XLp(m) is alternatively designated $XLp^1(m)$. $XLp^1(m)$ is sequentially delayed by time delay increments $\tau_1$, $\tau_2$, $\tau_3$, . . . , $\tau_{N-2}$, $\tau_{N-1}$, and $\tau_N$ to produce delayed outputs at the taps of delay line 42 which are respectively designated $XLp^2(m)$, $XLp^3(m)$, $Xlp^4(m)$, . . . , $XLp^{N-1}(m)$, $XLp^N(m)$, and $XLp^{N+1}(m)$; (collectively designated $XLp^i(m)$). For delay line 44, XRp (m) is alternatively designated $XRp^{N+1}(m)$. $XRp^{N+1}(m)$ is sequentially delayed by time delay increments increments and $\tau_1$, $\tau_2$, $\tau_3$, . . . , $\tau_{N-2}$, $\tau_{N-1}$, and $\tau_N$ to produce delayed outputs at the taps of delay line 44 which are respectively designated: $XRp^N(m)$, $XRp^{N-1}(m)$, $XRp^{N-2}(m)$, . . . , $XLp^3(m)$, $XLp^2(m)$, and $Xlp^1(m)$; (collectively designated $XRp^i(m)$). The input spectral signals and the signals from delay line 42, 44 taps are arranged as input pairs to operation array 46. A pair of taps from delay lines 42, 44 is illustrated as input pair P in FIG. 3.

Operation array 46 has operation units (OP) numbered from 1 to N+1, depicted as OP1, OP2, OP3, OP4, . . . , OPN−2, OPN−1, OPN, OPN+1 and collectively designated operations OPi. Input pairs from delay lines 42, 44 correspond to the operations of array 46 as follows: OP1[$XLp^1(m)$, $XRp^1(m)$], OP2[$XLp^2(m)$, $XRp^2(m)$], OP3[$XLp^3(m)$, $XRp^3(m)$], OP4[$XLp^4(m)$, $XRp^4(m)$], . . . , OPN−2[$XLp^{(N-2)}(m)$, $XRp^{(N-2)}(m)$], OPN−1[$XLp^{(N+1)}(m)$, $XRp^{(N+1)}(m)$], OPN[$XLp^N(m)$, $XRp^N(m)$], and OPN+1[$XLp^{(N+1)}(m)$, $XRp^{(N+1)}(m)$]; where OPi[$XLp^i(m)$, $XRp^i(m)$] indicates that OPi is determined as a function of input pair $XLp^i(m)$, $XRp^i(m)$. Correspondingly, the outputs of operation array 46 are $Xp^1(m)$, $Xp^2(m)$, $Xp^3(m)$, $Xp^4(m)$, . . . , $Xp^{(N-2)}(m)$, $Xp^{(N-1)}(m)$, $Xp^N(m)$, and $Xp^{(N+1)}(m)$ (collectively designated $Xp^i(m)$).

For i=1 to i≦N/2, operations for each OPi of array 46 are determined in accordance with complex expression 1 (CE1) as follows:

$$Xp^i(m) = \frac{XLp^i(m) - XRp^i(m)}{\exp[-j2\pi(\tau_1 + \ldots + \tau_{N/2})f_m] - \exp[j2\pi(\tau_{((N/2)+1)} + \ldots + \tau_{(N-i+1)})f_m]},$$

where exp[argument] represents a natural exponent to the power of the argument, and imaginary numberj is the square root of −1. For i>((N/2)+1) to i=N+1, operations of operation array 46 are determined in accordance complex expression 2 (CE2) as follows:

$$Xp^i(m) = \frac{XLp^i(m) - XRp^i(m)}{\exp[j2\pi(\tau_{((N/2)+1)} + \ldots + \tau_{(i-1)})f_m] - \exp[-j2\pi(\tau_{(N-i+2)} + \ldots + \tau_{N/2})f_m]},$$

where exp[argument] represents a natural exponent to the power of the argument, and imaginary numberj is the square root of −1. For i=(N/2)+1, neither CE1 nor CE2 is performed.

An example of the determination of the operations for N=4 (i=1 to i=N+1) is as follows:

i=1, CE1 applies as follows:

$$Xp^1(m) = \frac{XLp^1(m) - XRp^1(m)}{\exp[-j2\pi(\tau_1 + \tau_2)f_m] - \exp[j2\pi(\tau_3 + \tau_4)f_m]};$$

i=2≦(N/2), CE1 applies as follows:

$$Xp^2(m) = \frac{XLp^2(m) - XRp^2(m)}{\exp[-j2\pi(\tau_2)f_m] - \exp[j2\pi(\tau_3)f_m]};$$

i=3: Not applicable, (N/2)<i≦((N/2)+1);

i=4, CE2 applies as follows:

$$Xp^4(m) = \frac{XLp^4(m) - XRp^4(m)}{\exp[j2\pi(\tau_3)f_m] - \exp[-j2\pi(\tau_2)f_m]};$$

and, i=5, CE2 applies as follows:

$$Xp^5(m) = \frac{XLp^5(m) - XRp^5(m)}{\exp[j2\pi(\tau_3 + \tau_4)f_m] - \exp[-j2\pi(\tau_1 + \tau_2)f_m]}.$$

Referring to FIGS. 1–3, each OPi of operation array 46 is defined to be representative of a different azimuthal position relative to reference axis R. The "center" operation, OPi where i=((N/2)+1), represents the location of the reference axis and source 12. For the example N=4, this center operation corresponds to i=3. This arrangement is analogous to the different interaural time differences associated with a natural binaural hearing system. In these natural systems, there is a relative position in each sound passageway within the ear that corresponds to a maximum "in phase" peak for a given sound source. Accordingly, each operation of array 46 represents a position corresponding to a potential azimuthal or angular position range for a sound source, with the center operation representing a source at the zero azimuth—a source aligned with reference axis R. For an environment having a single source without noise or interference, determining the signal pair with the maximum strength may be sufficient to locate the source with little additional processing; however, in noisy or multiple source environments, further processing may be needed to properly estimate locations.

It should be understood that dual delay line 40 provides a two dimensional matrix of outputs with N+1 columns corresponding to $Xp^i(m)$, and M rows corresponding to each discrete frequency $f_m$ of $Xp^i(m)$. This (N+1)×M matrix is determined for each short-term spectral analysis interval p. Furthermore, by subtracting $XRp^i(m)$ from $XLp^i(m)$, the denominator of each expression CE1, CE2 is arranged to provide a minimum value of $Xp^i(m)$ when the signal pair is "in-phase" at the given frequency $f_m$. Localization stage 70 uses this aspect of expressions CE1, CE2 to evaluate the location of source 14 relative to source 12.

Localization stage 70 accumulates P number of these matrices to determine the $Xp^i(m)$ representative of the position of source 14. For each column i, localization stage 70 performs a summation of the amplitude of $|Xp^i(m)|$ to the second power over frequencies $f_m$ from m=1 to m=M. The summation is then multiplied by the inverse of M to find an average spectral energy as follows:

$$Xavgp^i = (1/M)\sum_{m=1}^{M}|Xp^i(m)|^2.$$

The resulting averages, $Xavgp^i$ are then time averaged over the P most recent spectral-analysis time frames indexed by p in accordance with:

$$X^i = \sum_{p=1}^{P}\gamma p Xavgp^i,$$

where γp are empirically determined weighting factors. In one embodiment, the γp factors are preferably between $0.85^p$ and $0.90^p$, where p is the short-term spectral analysis time frame index. The $X^i$ are analyzed to determine the minimum value, $\min(X^i)$. The index i of $\min(X^i)$, designated "I," estimates the column representing the azimuthal location of source 14 relative to source 12.

It has been discovered that the spectral content of a desired signal from source 12, when approximately aligned with reference axis R1, can be estimated from $Xp^I(m)$. In other words, the spectral signal output by array 46 which most closely corresponds to the relative location of the "off-axis" source 14 contemporaneously provides a spectral representation of a signal emanating from source 12. As a result, the signal processing of dual delay line 40 not only facilitates localization of source 14, but also provides a spectral estimate of the desired signal with only minimal post-localization processing to produce a representative output.

Post-localization processing includes provision of a designation signal by localization stage 70 to conceptual "switch" 80 to select the output column $Xp^I(m)$ of the dual delay line 40. The $Xp^I(m)$ is routed by switch 80 to an inverse Discrete Fourier Transform algorithm (Inverse DFT) in stage 82 for conversion from a frequency domain signal representation to a discrete time domain signal representation denoted as s(k). The signal estimate s(k) is then converted by Digital to Analog (D/A) converter 84 to provide an output signal to output device 90.

Output device 90 amplifies the output signal from processor 30 with amplifier 92 and supplies the amplified signal to speaker 94 to provide the extracted signal from a source 12.

It has been found that interference from off-axis sources separated by as little as 2 degrees from the on axis source may be reduced or eliminated with the present invention—even when the desired signal includes speech and the interference includes babble. Moreover, the present invention provides for the extraction of desired signals even when the interfering or noise signal is of equal or greater relative intensity. By moving sensors 22, 24 in tandem the signal selected to be extracted may correspondingly be changed. Moreover, the present invention may be employed in an environment having many sound sources in addition to sources 12, 14. In one alternative embodiment, the localization algorithm is configured to dynamically respond to relative positioning as well as relative strength, using automated learning techniques. In other embodiments, the present invention is adapted for use with highly directional microphones, more than two sensors to simultaneously extract multiple signals, and various adaptive amplification and filtering techniques known to those skilled in the art.

The present invention greatly improves computational efficiency compared to conventional systems by determining a spectral signal representative of the desired signal as part of the localization processing. As a result, an output signal characteristic of a desired signal from source 12 is determined as a function of the signal pair $XLp^1(m)$, $XRp^1(m)$ corresponding to the separation of source 14 from source 12. Also, the exponents in the denominator of CE1, CE2 correspond to phase difference of frequencies $f_m$ resulting from the separation of source 12 from 14. Referring to the example of N=4 and assuming that I=1, this phase difference is $-2\pi(\tau_1+\tau_2)f_m$ (for delay line 42) and $2\pi(\tau_3+\tau_4)f_m$ (for delay line 44) and corresponds to the separation of the representative location of off-axis source 14 from the on-axis source 12 at i=3. Likewise the time increments, $\tau_1+\tau_2$ and $\tau_3+\tau_4$, correspond to the separation of source 14 from source 12 for this example. Thus, processor 30 implements dual delay line 40 and corresponding operational relationships CE1, CE2 to provide a means for generating a desired signal by locating the position of an interfering signal source relative to the source of the desired signal.

It is preferred that $\tau_i$ be selected to provide generally equal azimuthal positions relative to reference axis R. In one embodiment, this arrangement corresponds to the values of $\tau_i$ changing about 20% from the smallest to the largest value. In other embodiments, $\tau_i$ are all generally equal to one another, simplifying the operations of array 46. Notably, the pair of time increments in the numerator of CE1, CE2 corresponding to the separation of the sources 12 and 14 become approximately equal when all values $\tau_i$ are generally the same.

Processor 30 may be comprised of one or more components or pieces of equipment. The processor may include digital circuits, analog circuits, or a combination of these circuit types. Processor 30 may be programmable, an integrated state machine, or utilize a combination of these techniques. Preferably, processor 30 is a solid state integrated digital signal processor circuit customized to perform the process of the present invention with a minimum of external components and connections. Similarly, the extraction process of the present invention may be performed on variously arranged processing equipment configured to provide the corresponding functionality with one or more hardware modules, firmware modules, software modules, or a combination thereof. Moreover, as used herein, "signal" includes, but is not limited to, software, firmware, hardware, programming variable, communication channel, and memory location representations.

Figure 4A:
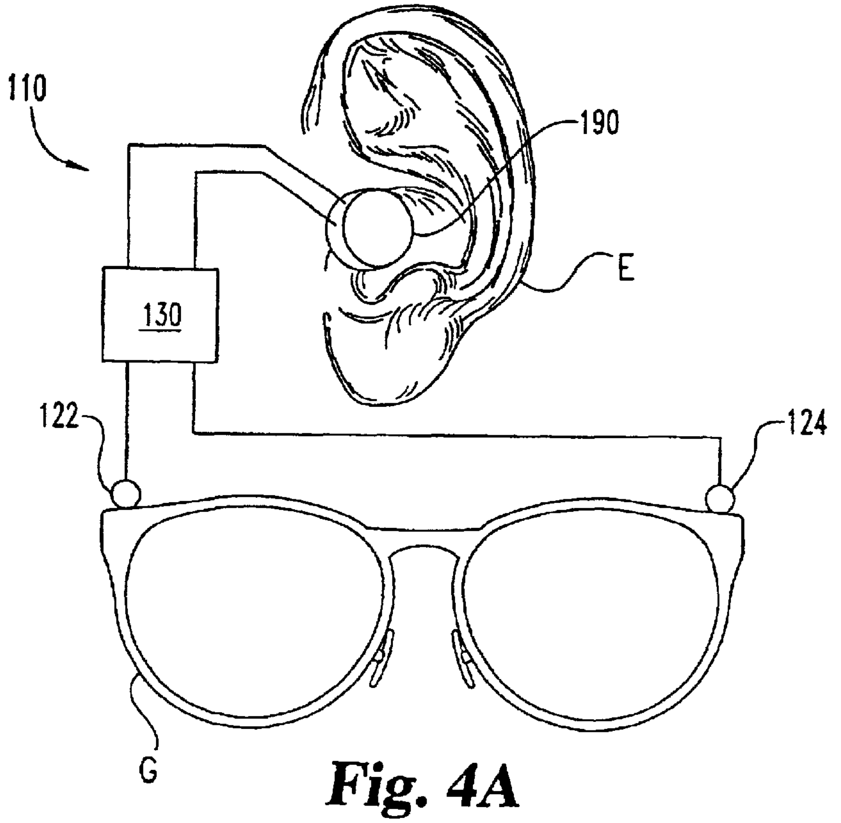
FIGS. 4A and 4B depict other embodiments of the present invention corresponding to hearing aid and computer voice recognition applications, respectively.

Referring to FIG. 4A, one application of the present invention is depicted as hearing aid system 110. System 110 includes eyeglasses G with microphones 122 and 124 fixed to glasses G and displaced from one another. Microphones 122, 124 are operatively coupled to hearing aid processor 130. Processor 130 is operatively coupled to output device 190. Output device 190 is positioned in ear E to provide an audio signal to the wearer.

Microphones 122, 124 are utilized in a manner similar to sensors 22, 24 of the embodiment depicted by FIGS. 1–3. Similarly, processor 130 is configured with the signal extraction process depicted in of FIGS. 1–3. Processor 130 provides the extracted signal to output device 190 to provide an audio output to the wearer. The wearer of system 110 may position glasses G to align with a desired sound source, such as a speech signal, to reduce interference from a nearby noise source off axis from the midpoint between microphones 122, 124. Moreover, the wearer may select a different signal by realigning with another desired sound source to reduce interference from a noisy environment.

Processor 130 and output device 190 may be separate units (as depicted) or included in a common unit worn in the ear. The coupling between processor 130 and output device 190 may be an electrical cable or a wireless transmission. In one alternative embodiment, sensors 122, 124 and processor 130 are remotely located and are configured to broadcast to one or more output devices 190 situated in the ear E via a radio frequency transmission or other conventional telecommunication method.

Figure 4B:
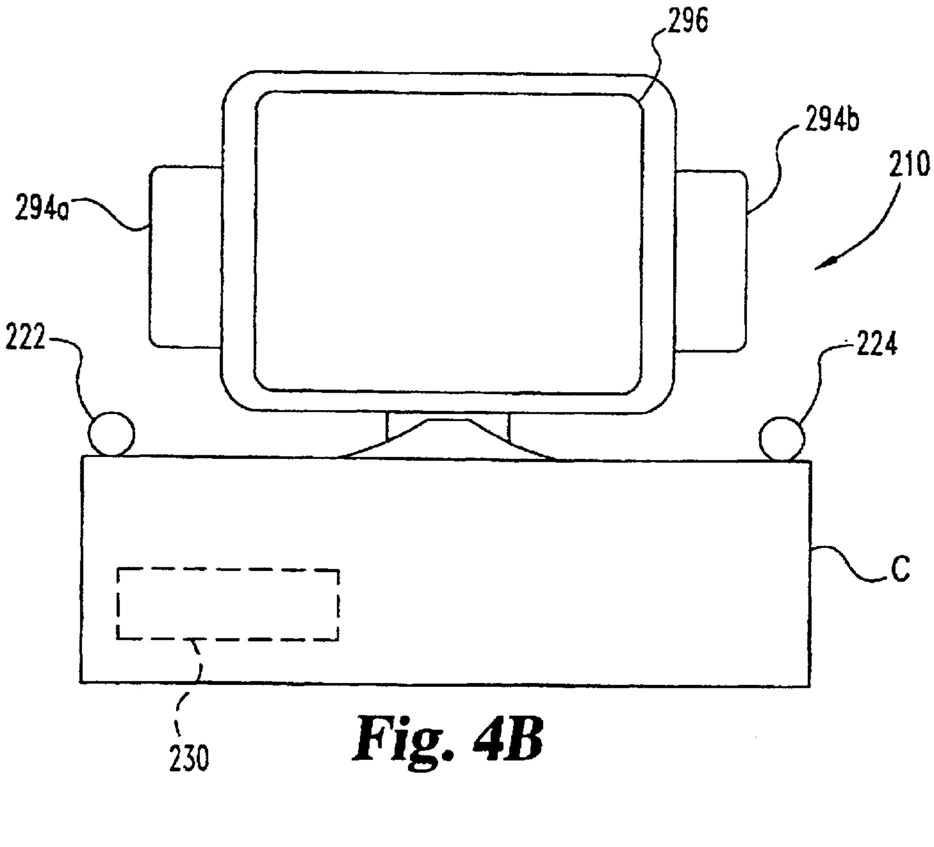

FIG. 4B shows a voice recognition system 210 employing the present invention as a front end speech enhancement device. System 210 includes personal computer C with two microphones 222, 224 spaced apart from each other in a predetermined relationship. Microphones 222, 224 are operatively coupled to a processor 230 within computer C. Processor 230 provides an output signal for internal use or responsive reply via speakers 294*a*, 294*b* or visual display 296. An operator aligns in a predetermined relationship with microphones 222, 224 of computer C to deliver voice commands. Computer C is configured to receive these voice commands, extracting the desired voice command from a noisy environment in accordance with the process system of FIGS. 1–3.

Figure 10:
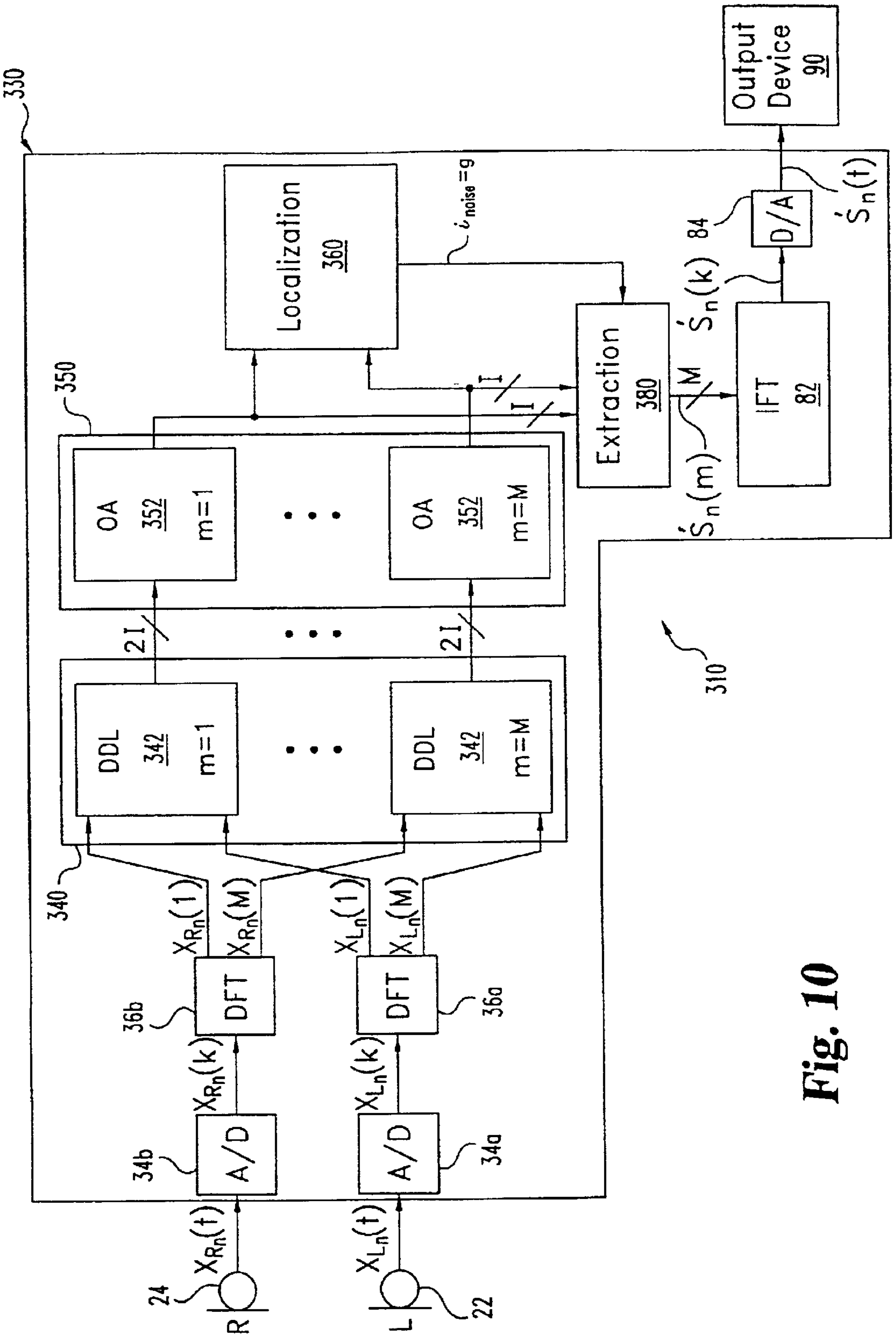
FIG. 10 is a signal flow diagram of another embodiment of the present invention.

Referring to FIGS. 10–13, signal processing system 310 of another embodiment of the present invention is illustrated. Reference numerals of system 310 that are the same as those of system 10 refer to like features. The signal flow diagram of FIG. 10 corresponds to various signal processing techniques of system 310. FIG. 10 depicts left "L" and right "R" input channels for signal processor 330 of system 310. Channels L, R each include an acoustic sensor 22, 24 that provides an input signal $x_{Ln}(t)$, $x_{Rn}(t)$, respectively. Input signals $x_{Ln}(t)$ and $x_{Rn}(t)$ correspond to composites of sounds from multiple acoustic sources located within the detection range of sensors 22, 24. As described in connection with FIG. 1 of system 10, it is preferred that sensors 22, 24 be standard microphones spaced apart from each other at a predetermined distance D. In other embodiments a different sensor type or arrangement may be employed as would occur to those skilled in the art.

Sensors 22, 24 are operatively coupled to processor 330 of system 310 to provide input signals $x_{Ln}(t)$ and $x_{Rn}(t)$ to A/D converters 34*a*, 34*b*. A/D converters 34*a*, 34*b* of processor 330 convert input signals $x_{Ln}(t)$ and $x_{Rn}(t)$ from an analog form to a discrete form as represented as $x_{Ln}(k)$ and $x_{Rn}(k)$, respectively; where "t" is the familiar continuous time domain variable and "k" is the familiar discrete sample index variable. A corresponding pair of preconditioning filters (not shown) may also be included in processor 330 as described in connection with system 10.

Digital Fourier Transform (DFT) stages 36*a*, 36*b* receive the digitized input signal pair $x_{Ln}(k)$ and $x_{Rn}(k)$ from converters 34*a*, 34*b*, respectively. Stages 36*a*, 36*b* transform input signals as $x_{Ln}(k)$ and $x_{Rn}(k)$ into spectral signals designated $X_{Ln}(m)$ and $X_{Rn}(m)$ using a short term discrete Fourier transform algorithm. Spectral signals $X_{Ln}(m)$ and $X_{Rm}(m)$ are expressed in terms of a number of discrete frequency components indexed by integer m; where m=1, 2, . . . , M. Also, as used herein, the subscripts L and R denote the left and right channels, respectively, and n indexes time frames for the discrete Fourier transform analysis.

Delay operator 340 receives spectral signals $X_{Ln}(m)$ and $X_{Rn}(m)$ from stages 36*a*, 36*b*, respectively. Delay operator 340 includes a number of dual delay lines (DDLs) 342 each corresponding to a different one of the component frequencies indexed by m. Thus, there are M different dual delay lines 342 utilized. However, only dual delay lines 342 corresponding to m=1 and m=M are shown in FIG. 10 to preserve clarity. The remaining dual delay lines corresponding to m=2 through m=(M−1) are represented by an ellipsis to preserve clarity. Alternatively, delay operator 340 may be described as a single dual delay line that simultaneously operates on M frequencies like dual delay line 40 of system 10.

The pair of frequency components from DFT stages 36*a*, 36*b* corresponding to a given value of m are inputs into a corresponding one of dual delay lines 342. For the examples illustrated in FIG. 10, spectral signal component pair $X_{Ln}$(m=1) and $X_{Rn}$(m=1) is sent to the upper dual delay line 342 for the frequency corresponding to m=1; and spectral signal component pair $X_{Ln}$(m=M) and $X_{Rn}$(m=M) is sent to the lower dual delay line 342 for the frequency corresponding to m=M. Likewise, common frequency component pairs of $X_{Ln}(m)$ and $X_{Rn}(m)$ for frequencies corresponding to m=2 through m=(M−1) are each sent to a corresponding dual delay line as represented by ellipses to preserve clarity.

Figure 11:
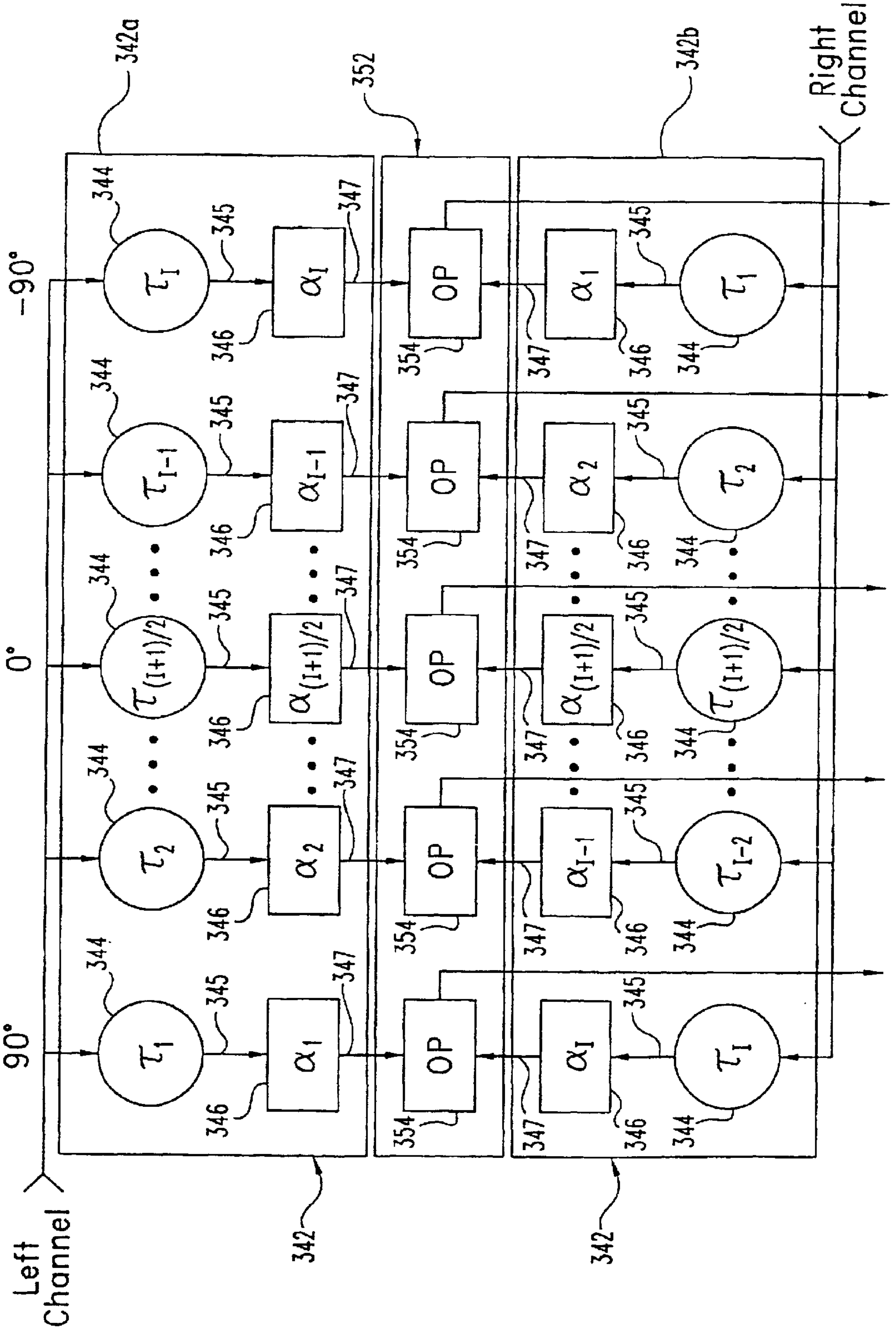
FIG. 11 is a partial, signal flow diagram illustrating selected aspects of the dual delay lines of FIG. 10 in greater detail.

Referring additionally to FIG. 11, certain features of dual delay line 342 are further illustrated. Each dual delay line 342 includes a left channel delay line 342 a receiving a corresponding frequency component input from DFT stage 36*a* and right channel delay line 342*b* receiving a corresponding frequency component input from DFT stage 36*b*. Delay lines 342*a*, 342*b* each include an odd number I of delay stages 344 indexed by i=1, 2, . . . , I. The I number of delayed signal pairs are provided on outputs 345 of delay stages 344 and are correspondingly sent to complex multipliers 346. There is one multiplier 346 corresponding to each delay stage 344 for each delay line 342*a*, 342*b*. Multipliers 346 provide equalization weighting for the corresponding outputs of delay stages 344. Each delayed signal pair from corresponding outputs 345 has one member from a delay stage 344 of left delay line 342*a* and the other member from a delay stage 344 of right delay line 342*b*. Complex multipliers 346 of each dual delay line 342 output corresponding products of the I number of delayed signal pairs along taps 347. The I number of signal pairs from taps 347 for each dual delay line 342 of operator 340 are input to signal operator 350.

For each dual delay line 342, the I number of pairs of multiplier taps 347 are each input to a different Operation Array (OA) 352 of operator 350. Each pair of taps 347 is provided to a different operation stage 354 within a corresponding operation array 352. In FIG. 11, only a portion of delay stages 344, multipliers 346, and operation stages 354 are shown corresponding to the two stages at either end of delay lines 342*a*, 342*b* and the middle stages of delay lines 342*a*, 342*b*. The intervening stages follow the pattern of the illustrated stages and are represented by ellipses to preserve clarity.

For an arbitrary frequency $\omega_m$, delay times $\tau_i$ are given by equation (1) as follows:

$$\tau_i = \frac{ITD_{\max}}{2}\sin\left(\frac{i-1}{I-1}\pi - \frac{\pi}{2}\right),\ i = 1, \ldots, I \tag{1}$$

where, i is the integer delay stage index in the range (i=1, . . . I); $ITD_{max}$=D/c is the maximum Intermicrophone Time Difference; D is the distance between sensors 22, 24; and c is the speed of sound. Further, delay times $\tau_i$ are antisymmetric with respect to the midpoint of the delay stages corresponding to i=(I+1)/2 as indicated in the following equation (2):

$$\tau_{I-i+1} = \frac{ITD_{\max}}{2}\sin\left[\frac{(I-i+1)-1}{I-1}\pi - \frac{\pi}{2}\right] = -\frac{ITD_{\max}}{2}\sin\left(\frac{i-1}{I-1}\pi - \frac{\pi}{2}\right) = -\tau_i. \tag{2}$$

The azimuthal plane may be uniformly divided into I sectors with the azimuth position of each resulting sector being given by equation (3) as follows:

$$\theta_i = \frac{i-1}{I-1}180°\text{–}90°,\ i = 1, \ldots, I. \tag{3}$$

The azimuth positions in auditory space may be mapped to corresponding delayed signal pairs along each dual delay line 342 in accordance with equation (4) as follows:

$$\tau_i = \frac{ITD_{\max}}{2}\sin\theta_i,\ i = 1, \ldots, I. \tag{4}$$

The dual delay-line structure is similar to the embodiment of system 10, except that a different dual delay line is represented for each value of m and multipliers 346 have been included to multiply each corresponding delay stage 344 by an appropriate one of equalization factors $\alpha_i(m)$; where i is the delay stage index previously described. Preferably, elements $\alpha_i(m)$ are selected to compensate for differences in the noise intensity at sensors 22, 24 as a fuction of both azimuth and frequency.

Figure 12:
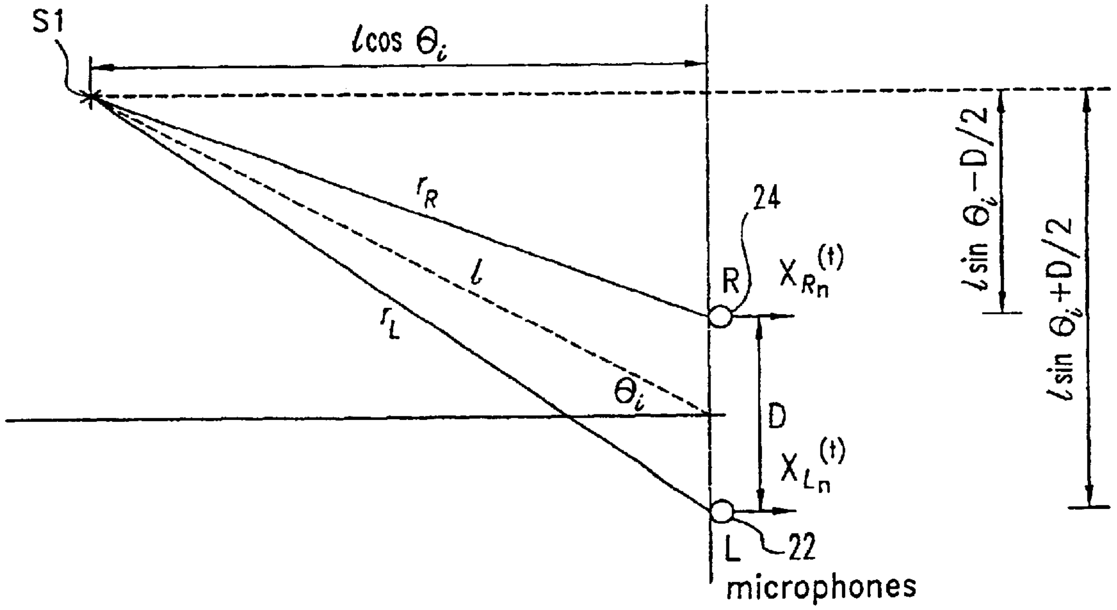
FIG. 12 is a diagram illustrating selected geometric features of the embodiment illustrated in FIG. 10 for a representative example of one of a number of sound sources.

One preferred embodiment for determining equalization factors $\alpha_i(m)$ assumes amplitude compensation is independent of frequency, regarding any departure from this model as being negligible. For this embodiment, the amplitude of the received sound pressure |p| varies with the source-receiver distance r in accordance with equations (A1) and (A2) as follows:

$$|p| \propto \frac{1}{r}, \tag{A1}$$

$$\frac{|p_L|}{|p_R|} = \frac{r_R}{r_L}, \tag{A2}$$

where $|p_L|$ and $|p_R|$ are the amplitude of sound pressures at sensors 22, 24. FIG. 12 depicts sensors 22, 24 and a representative acoustic source S1 within the range of reception to provide input signals $x_{Ln}(t)$ and $x_{Rn}(t)$. According to the geometry illustrated in FIG. 12, the distances $r_L$ and $r_R$, from the source S1 to the left and right sensors, respectively, are given by equations (A3) and (A4), as follows:

$$r_L = \sqrt{(l\sin\theta_i + D/2)^2 + (l\cos\theta_i)^2} = \sqrt{l^2 + lD\sin\theta_i + D^2/4}, \tag{A3}$$

$$r_R = \sqrt{(l\sin\theta_i - D/2)^2 + (l\cos\theta_i)^2} = \sqrt{l^2 - lD\sin\theta_i + D^2/4}. \tag{A4}$$

For a given delayed signal pair in the dual delay-line 342 of FIG. 11 to become equalized under this approach, the factors $\alpha_i(m)$ and $\alpha_{I-i+1}(m)$ must satisfy equation (A5) as follows:

$$|p_L|\alpha_i(m) = |p_R|\alpha_{I-i+1}(m). \tag{A5}$$

Substituting equation (A2) into equation (A5), equation (A6) results as follows:

$$\frac{r_L}{r_R} = \frac{\alpha_i(m)}{\alpha_{I-i+1}(m)}. \tag{A6}$$

By defining the value of $\alpha_i(m)$ in accordance with equation (A7) as follows:

$$\alpha_i=(m)=K\sqrt{l^2+lD\sin\theta_i+D^2/4}, \tag{A7}$$

where, K is in units of inverse length and is chosen to provide a convenient amplitude level, the value of $\alpha_{I-i+1}$ (m) is given by equation (A8) as follows:

$$\alpha_{I-i+1}(m)=K\sqrt{l^2+lD\sin\theta_{I-i+1}+D^2/4}=K\sqrt{l^2-lD\sin\theta_i+D^2/4}, \tag{A8}$$

where, the relation $\sin\theta_{I-i+1}=\sin\theta_i$ can be obtained by substituting I−i+1 into i in equation (3). By substituting equations (A7) and (A8) into equation (A6), it may be verified that the values assigned to $\alpha_i(m)$ in equation (A7) satisfy the condition established by equation (A6).

After obtaining the equalization factors $\alpha_i(m)$ in accordance with this embodiment, minor adjustments are preferably made to calibrate for asymmetries in the sensor arrangement and other departures from the ideal case such as those that might result from media absorption of acoustic energy, an acoustic source geometry other than a point source, and dependence of amplitude decline on parameters other than distance.

After equalization by factors $\alpha_i(m)$ with multipliers 346, the in-phase desired signal component is generally the same in the left and right channels of the dual delay lines 342 for the delayed signal pairs corresponding to $i=i_{signal}=s$, and the in-phase noise signal component is generally the same in the left and right channels of the dual delay lines 342 for the delayed signal pairs corresponding to $i=i_{noise}=g$ for the case of a single, predominant interfering noise source. The desired signal at i=s may be expressed as $S_n(m)=A_s\exp[j(\omega_m t+\Phi_s)]$; and the interfering signal at i=g may be expressed as $G_n(m)=A_g\exp[j(\omega_m t+\Phi_g)]$, where $\Phi_s$ and $\Phi_g$ denote initial phases. Based on these models, equalized signals $\alpha_i(m)X_{Ln}^{(i)}(m)$ for the left channel and $\alpha_{I-i+1}(m)X_{Rn}^{(i)}(m)$ for the right channel at any arbitrary point i (except i=s) along dual delay lines 342 may be expressed in equations (5) and (6) as follows:

$$\alpha_i(m)X_{Ln}^{(i)}(m) = A_s\exp j\,[\omega_m(t+\tau_s-\tau_i)+\phi_s] + A_g\exp j\,[\omega_m(t+\tau_g-\tau_i)+\phi_g], \tag{5}$$

$$\alpha_{I-i+1}(m)X_{Rn}^{(i)}(m) = A_s\exp j\,[\omega_m(t+\tau_{I-z+1}-\tau_{I-i+1})+\phi_s] + A_g\exp j\,[\omega_m(t+\tau_{I-g+1}-\tau_{I-i+1})+\phi_g]. \tag{6}$$

where equations (7) and (8) further define certain terms of equations (5) and (6) as follows:

$$X_{Ln}^{(i)}(m) = X_{Ln}(m)\exp(-j2\pi f_m\tau_i) \tag{7}$$

$$X_{Rn}^{(i)}(m) = X_{Rn}(m)\exp(-j2\pi f_m\tau_{I-i+1}) \tag{8}$$

Each signal pair $\alpha_i(m)X_{Ln}^{(i)}(m)$ and $\alpha_{I-i+1}(m)X_{Rn}^{(i)}(m)$ is input to a corresponding operation stage 354 of a corresponding one of operation arrays 352 for all m; where each operator array 352 corresponds to a different value of m as in the case of dual delay lines 342. For a given operation array 352, operation stages 354 corresponding to each value of I, except i=s, perform the operation defined by equation (9) as follows:

$$X_n^{(i)}(m)=\frac{\alpha_i(m)X_{Li}^{(i)}(m)-\alpha_{I-i+1}(m)X_{Rn}^{(i)}(m)}{(\alpha_i/\alpha_s)\exp[j\omega_m(\tau_s-\tau_i)]-(\alpha_{I-i+1}/\alpha_{I-s+1})\exp[j\omega_m(\tau_{I-s+1}-\tau_{I-i+1})]},\ \text{for } i\neq s. \tag{9}$$

If the value of the denominator in equation (9) is too small, a small positive constant $\epsilon$ is added to the denominator to limit the magnitude of the output signal $X_n^{(i)}(m)$. No operation is performed by the operation stage 354 on the signal pair corresponding to i=s for all m (all operation arrays 352 of signal operator 350).

Equation (9) is comparable to the expressions CE1 and CE2 of system 10; however, equation (9) includes equalization elements $\alpha_i(m)$ and is organized into a single expression. With the outputs from operation array 352, the simultaneous localization and identification of the spectral content of the desired signal may be performed with system 310. Localization and extraction with system 310 are further described by the signal flow diagram of FIG. 13 and the following mathematical model. By substituting equations (5) and (6) into equation (9), equation (10) results as follows:

$$X_n^{(i)}(m)=S_n(m)+G_n(m)\cdot v_{s,g}^{(i)}(m),\ i\neq s \tag{10}$$

where equation (11) further defines:

$$v_{s,g}^{(i)}(m)=\frac{(\alpha_i/\alpha_g)\exp[j\omega_m(\tau_g-\tau_i)]-(\alpha_{I-i+1}/\alpha_{I-g+1})\exp[j\omega_m(\tau_{I-g+1}-\tau_{I-i+1})]}{(\alpha_i/\alpha_s)\exp[j\omega_m(\tau_s-\tau_i)]-(\alpha_{I-i+1}/\alpha_{I-s+1})\exp[j\omega_m(\tau_{I-s+1}-\tau_{I-i+1})]},\ i\neq s \tag{11}$$

By applying equation (2) to equation (11), equation (12) results as follows:

$$v_{s,g}^{(i)}(m)=\frac{(\alpha_i/\alpha_g)\exp[j\omega_m(\tau_g-\tau_i)]-(\alpha_{I-i+1}/\alpha_{I-g+1})\exp[j\omega_m(\tau_g-\tau_i)]}{(\alpha_i/\alpha_s)\exp[j\omega_m(\tau_s-\tau_i)]-(\alpha_{I-i+1}/\alpha_{I-s+1})\exp[-j\omega_m(\tau_s-\tau_i)]},\ i\neq s. \tag{12}$$

The energy of the signal $X_n^{(i)}(m)$ is expressed in equation (13) as follows:

$$|X_n^{(i)}(m)|^2=|S_n(m)+G_n(m)\cdot v_{s,g}^{(i)}(m)|^2. \tag{13}$$

A signal vector may be defined:

$$x^{(i)}=(X_1^{(i)}(1),X_1^{(i)}(2),\ldots,X_1^{(i)}(M),X_2^{(i)}(1),\ldots,X_2^{(i)}(M),\ldots,X_N^{(i)}(1),\ldots,X_N^{(i)}(M))^T,\ i=1,\ldots,I,$$

where, T denotes transposition. The energy $\|x^{(i)}\|_2^2$ of the vector $x^{(i)}$ is given by equation (14) as follows:

$$\|x^{(i)}\|_2^2=\sum_{n=1}^{N}\sum_{m=1}^{M}|X_n^{(i)}(m)|^2 \tag{14}$$

-continued $$=\sum_{n=1}^{N}\sum_{m=1}^{M}|S_n(m)+G_n(m)\cdot v_{s,g}^{(i)}(m)|^2,\ i=1,\ldots,I.$$

Equation (14) is a double summation over time and frequency that approximates a double integration in a continuous time domain representation.

Further defining the following vectors:

$$s=(S_1(1),S_1(2),\ldots,S_1(M),S_2(1),\ldots,S_2(M),\ldots,S_N(1),\ldots,S_N(M))^T,$$

and $$g^{(i)}=(G_1(1)v_{s,g}^{(i)}(1),G_1(2)v_{s,g}^{(i)}(2),\ldots,G_1(M)v_{s,g}^{(i)}(M),G_2(1)v_{s,g}^{(i)}(1),\ldots,G_2(M)v_{s,g}^{(i)}(M),\ldots,G_N(1)v_{s,g}^{(i)}(1),\ldots,G_N(M)v_{s,g}^{(i)}(M))^T,\ \text{where } i=1,\ldots,I.$$

the energy of vectors s and $g^{(i)}$ are respectively defined by equations (15) and (16) as follows:

$$\|s\|_2^2=\sum_{n=1}^{N}\sum_{m=1}^{M}|S_n(m)|^2 \tag{15}$$

$$\|g^{(i)}\|_2^2=\sum_{n=1}^{N}\sum_{m=1}^{M}|G_n(m)\cdot v_{s,g}^{(i)}(m)|^2,\ i=1,\ldots,I. \tag{16}$$

For a desired signal that is independent of the interfering source, the vectors s and $g^{(i)}$ are orthogonal. In accordance with the Theorem of Pythagoras, equation (17) results as follows:

$$\|x^{(i)}\|_2^2=\|s+g^{(i)}\|_2^2=\|s\|_2^2+\|g^{(i)}\|_2^2,\ i=1,\ldots,I. \tag{17}$$

Because $\|g^{(i)}\|_2^2\geqq 0$, equation (18) results as follows:

$$\|x^{(i)}\|_2^2\geq\|s^{(i)}\|_2^2,\ i=1,\ldots,I. \tag{18}$$

The equality in equation (18) is satisfied only when $\|g^{(i)}\|_2^2=0$, which happens if either of the following two conditions are met: (a) $G_n(m)=0$, i.e., the noise source is silent—in which case there is no need for doing localization of the noise source and noise cancellation; and (b) $v_{s,g}^{(i)}(m)=0$; where equation (12) indicates that this second condition arises for $i=g=i_{noise}$. Therefore, $\|x^{(i)}\|_2^2$ has its minimum at $i=g=i_{noise}$, which according to equation (18) is $\|s\|_2^2$. Equation (19) further describes this condition as follows:

$$\|s\|_2^2=\|x^{(i_{noise})}\|_2^2=\min_i\|x^{(i)}\|_2^2. \tag{19}$$

Thus, the localization procedure includes finding the position $i_{noise}$ along the operation array 352 for each of the delay lines 342 that produces the minimum value of $\|x^{(i)}\|_2^2$. Once the location $i_{noise}$ along the dual delay line 342 is determined, the azimuth position of the noise source may be determined with equation (3). The estimated noise location $i_{noise}$ may be utilized for noise cancellation or extraction of the desired signal as further described hereinafter. Indeed, operation stages 354 for all m corresponding to $i=i_{noise}$ provide the spectral components of the desired signal as given by equation (20):

$$S_n(m) = X_n^{(i_{noise})}(m) = S_n(m) + G_n(m)\cdot v_{s,g}^{(i_{noise})}(m) = S_n(m). \quad (20)$$

Figure 13:
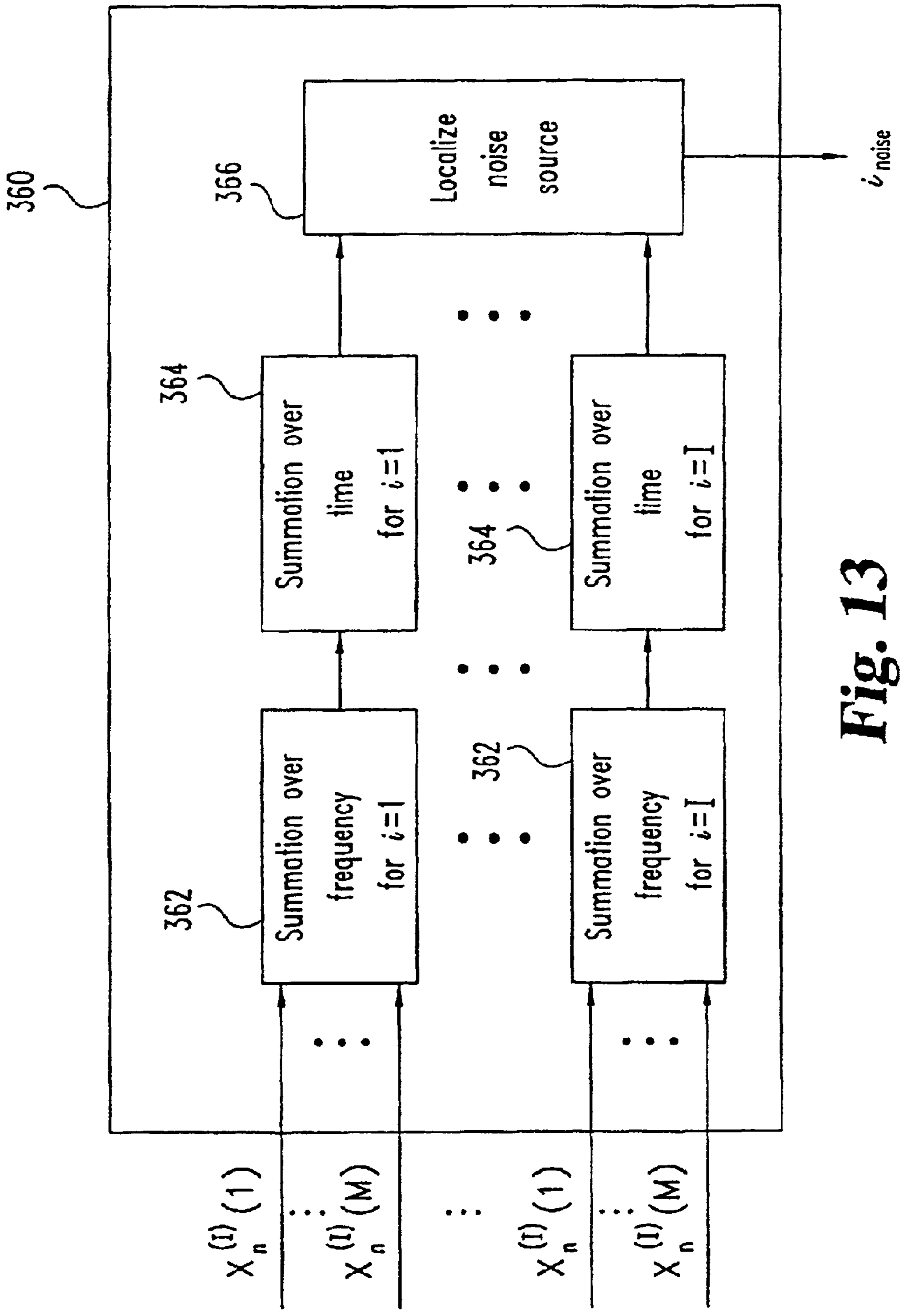
FIG. 13 is a signal flow diagram illustrating selected aspects of the localization operator of FIG. 10 in greater detail.

Localization operator 360 embodies the localization technique of system 310. FIG. 13 further depicts operator 360 with coupled pairs of summation operators 362 and 364 for each value of integer index i; where i=1, . . . , I. Collectively, summation operators 362 and 364 perform the operation corresponding to equation (14) to generate $\|x^{(i)}\|_2^2$ for each value of i. For each transform time frame n, the summation operators 362 each receive $X_n^{(i)}(1)$ through $X_n^{(i)}(M)$ inputs from operation stages 354 corresponding to their value of i and sums over frequencies m=1 through m=M. For the illustrated example, the upper summation operator 362 corresponds to i=1 and receives signals $X_n^{(1)}(1)$ through $X_n^{(1)}(M)$ for summation; and the lower summation operator 362 corresponds to i=I and receives signals $X_n^{(I)}(1)$ through $X_n^{(I)}(M)$ for summation.

Each summation operator 364 receives the results for each transform time frame n from the summation operator 362 corresponding to the same value of i and accumulates a sum of the results over time corresponding to n=1 through n=N transform time frames; where N is a quantity of time frames empirically determined to be suitable for localization. For the illustrated example, the upper summation operator 364 corresponds to i=1 and sums the results from the upper summation operator 362 over N samples; and the lower summation operator 364 corresponds to i=I and sums the results from the lower summation operator 362 over N samples.

The I number of values of $\|x^{(i)}\|_2^2$ resulting from the I number of summation operators 364 are received by stage 366. Stage 366 compares the I number of $\|x^{(i)}\|_2^2$ values to determine the value of i corresponding to the minimum $\|x^{(i)}\|_2^2$. This value of i is output by stage 366 as $i=g=i_{noise}$.

Referring back to FIG. 10, post-localization processing by system 310 is further described. When equation (9) is applied to the pair inputs of delay lines 342 at i=g, it corresponds to the position of the off-axis noise source and equation (20) shows it provides an approximation of the desired signal $\acute{S}_n(m)$. To extract signal $\acute{S}_n(m)$, the index value i=g is sent by stage 366 of localization unit 360 to extraction operator 380. In response to g, extraction operator 380 routes the outputs $X_n^{(g)}(1)$ through $X_n^{(g)}(M)=\acute{S}_n(m)$ to Inverse Fourier Transform (IFT) stage 82 operatively coupled thereto. For this purpose, extraction operator 380 preferably includes a multiplexer or matrix switch that has I×M complex inputs and M complex outputs; where a different set of M inputs is routed to the outputs for each different value of the index I in response to the output from stage 366 of localization operator 360.

Stage 82 converts the M spectral components received from extraction unit 380 to transform the spectral approximation of the desired signal, $\acute{S}_n(m)$, from the frequency domain to the time domain as represented by signal $\acute{S}_n(k)$. Stage 82 is operatively coupled to digital-to-analog (D/A) converter 84. D/A converter 84 receives signal $\acute{S}_n(k)$ for conversion from a discrete form to an analog form represented by $\acute{S}_n(t)$. Signal $\acute{S}_n(t)$ is input to output device 90 to provide an auditory representation of the desired signal or other indicia as would occur to those skilled in the art. Stage 82, converter 84, and device 90 are further described in connection with system 10.

Another form of expression of equation (9) is given by equation (21) as follows:

$$X_n^{(i)}(m) = w_{Ln}(m)X_{Ln}^{(i)} + w_{Rn}(m)X_{Rn}^{(i)}(m). \quad (21)$$

The terms $w_{Ln}$ and $w_{Rn}$ are equivalent to beamforming weights for the left and right channels, respectively. As a result, the operation of equation (9) may be equivalently modeled as a beamforming procedure that places a null at the location corresponding to the predominant noise source, while steering to the desired output signal $\acute{S}_n(t)$.

Figure 14:
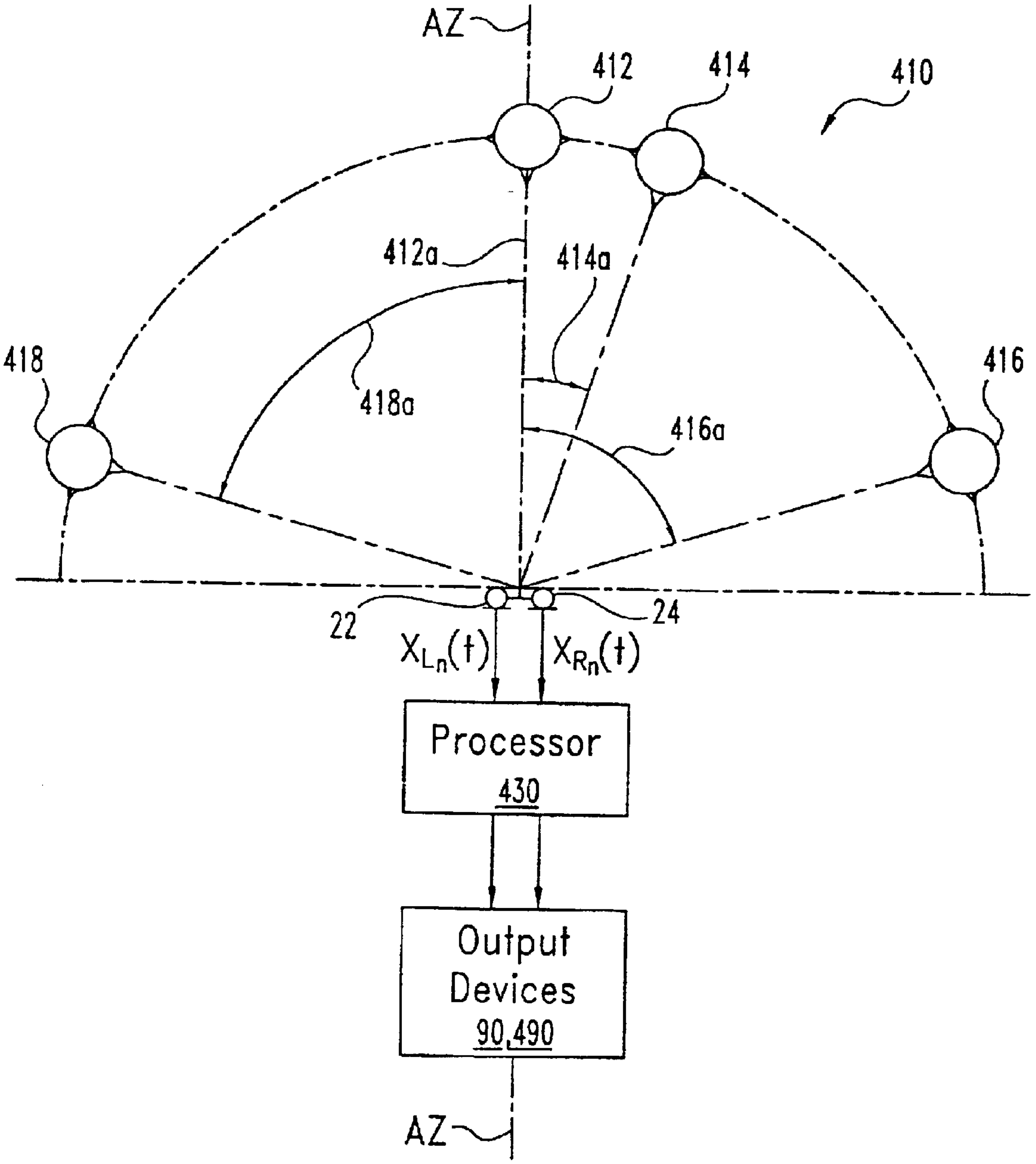
FIG. 14 is a diagram illustrating yet another embodiment of the present invention.

FIG. 14 depicts system 410 of still another embodiment of the present invention. System 410 is depicted with several reference numerals that are the same as those used in connection with systems 10 and 310 and are intended to designate like features. A number of acoustic sources 412, 414, 416, 418 are depicted in FIG. 14 within the reception range of acoustic sensors 22, 24 of system 410. The positions of sources 412, 414, 416, 418 are also represented by the azimuth angles relative to axis AZ that are designated with reference numerals 412*a*, 414*a*, 416*a*, 418*a*. As depicted, angles 412*a*, 414*a*, 416*a*, 418*a* correspond to about 0°, +20°, +75°, and −75°, respectively. Sensors 22, 24 are operatively coupled to signal processor 430 with axis AZ extending about midway therebetween. Processor 430 receives input signals $x_{Ln}(t)$, $x_{Rn}(t)$ from sensors 22, 24 corresponding to left channel L and right channel R as described in connection with system 310. Processor 430 processes signals $x_{Ln}(t)$, $x_{Rn}(t)$ and provides corresponding output signals to output devices 90, 490 operatively coupled thereto.

Figure 15:
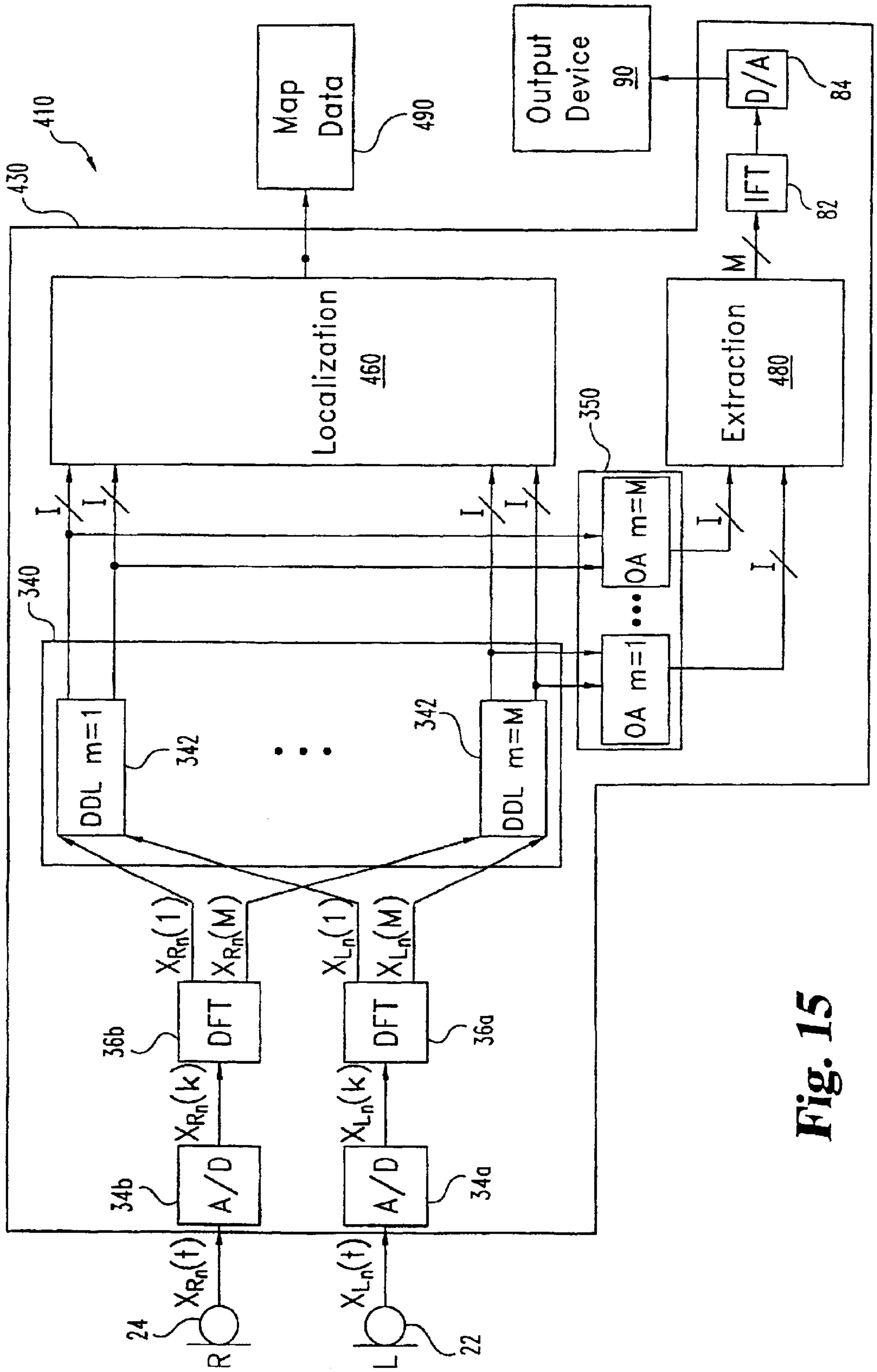
FIG. 15 is a signal flow diagram further illustrating selected aspects of the embodiment of FIG. 14.

Referring additionally to the signal flow diagram of FIG. 15, selected features of system 410 are further illustrated. System 410 includes D/A converters 34*a*, 34*b* and DFT stages 36*a*, 36*b* to provide the same left and right channel processing as described in connection with system 310. System 410 includes delay operator 340 and signal operator 350 as described for system 310; however it is preferred that equalization factors $\alpha_i(m)$ (i=1, . . . , I) be set to unity for the localization processes associated with localization operator 460 of system 410. Furthermore, localization operator 460 of system 410 directly receives the output signals of delay operator 340 instead of the output signals of signal operator 350, unlike system 310.

The localization technique embodied in operator 460 begins by establishing two-dimensional (2-D) plots of coincidence loci in terms of frequency versus azimuth position. The coincidence points of each loci represent a minimum difference between the left and right channels for each frequency as indexed by m. This minimum difference may be expressed as the minimum magnitude difference $\delta X_n^{(i)}(m)$ between the frequency domain representations $X_{Lp}^{(i)}(m)$ and $X_{Lp}^{(i)}(m)$, at each discrete frequency m, yielding M/2 potentially different loci. If the acoustic sources are spatially coherent, then these loci will be the same across all frequencies. This operation is described in equations (22)–(25) as follows:

$$i_n(m) = \underset{i}{\operatorname{argmin}}\{\delta X_n^{(i)}(m)\}, \quad m = 1, \ldots, M/2. \quad (22)$$

$$\delta X_n^{(i)}(m) = |X_{Ln}^{(i)}(m) - X_{Rn}^{(i)}(m)|, \quad i = 1, \ldots, I; \quad m = 1, \ldots, M/2, \quad (23)$$

-continued $$X_{Ln}^{(i)}(m) = X_{Ln}(m)\exp(-j2\pi\tau_i m/M), \quad i = 1, \ldots, I; \quad m = 1, \ldots, M/2, \tag{24}$$

$$X_{Rn}^{(i)}(m) = X_{Rn}(m)\exp(-j2\pi\tau_{I-i+1} m/M), \quad i = 1, \ldots, I; \quad m = 1, \ldots, M/2. \tag{25}$$

If the amplitudes of the left and right channels are generally the same at a given position along dual delay lines 342 of system 410 as indexed by i, then the values of $\delta X_n^{(i)}(m)$ for the corresponding value of i is minimized, if not essentially zero. It is noted that, despite inter-sensor intensity differences, equalization factors $\alpha_i(m)(i=1, \ldots, I)$ should be maintained close to unity for the purpose of coincidence detection; otherwise, the minimal $\delta X_n^{(i)}(m)$ will not correspond to the in-phase (coincidence) locations.

An alternative approach may be based on identifying coincidence loci from the phase difference. For this phase difference approach, the minimum of the phase difference between the left and right channel signals at positions along the dual delay lines 342, as indexed by i, are located as described by the following equations (26) and (27):

$$i_n(m) = \underset{i}{\operatorname{argmin}}\{\delta X_n^{(i)}(m)\}, \quad m = 1, \ldots, M/2, \tag{26}$$

$$\delta X_n^{(i)}(m) = \left|\operatorname{Im}\left[X_{Ln}^{(i)}(m) X_{Rn}^{(i)}(m)^{\dagger}\right]\right|, \quad i = 1, \ldots, I; \quad m = 1, \ldots, M/2, \tag{27}$$

where, Im[•] denotes the imaginary part of the argument, and the superscript † denotes a complex conjugate. Since the phase difference technique detects the minimum angle between two complex vectors, there is also no need to compensate for the inter-sensor intensity difference.

Figure 17:
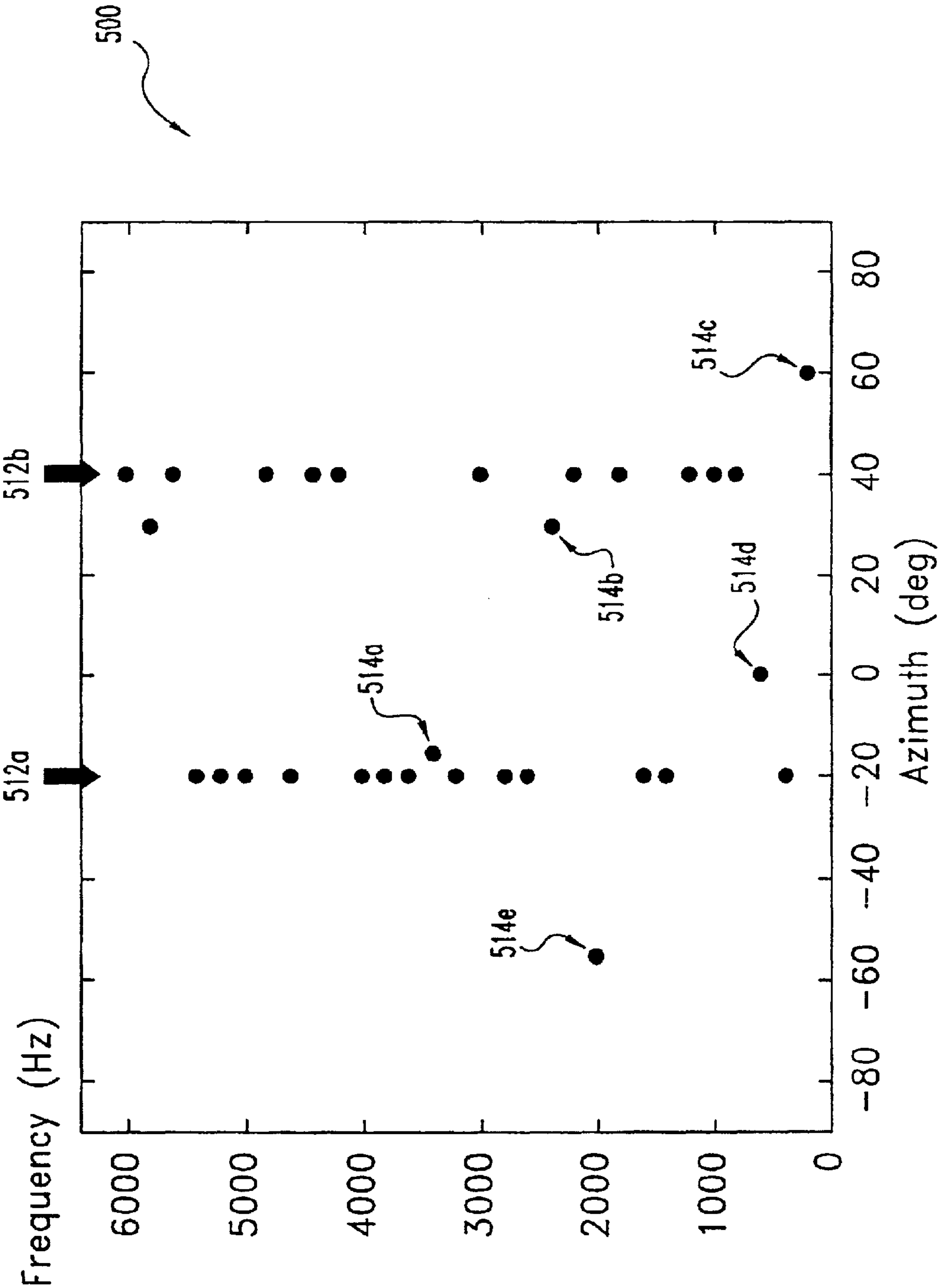
FIG. 17 is a graph illustrating a plot of coincidence loci for two sources.

While either the magnitude or phase difference approach may be effective without flurther processing to localize a single source, multiple sources often emit spectrally overlapping signals that lead to coincidence loci which correspond to nonexistent or phantom sources (e.g., at the midpoint between two equal intensity sources at the same frequency). FIG. 17 illustrates a 2-D coincidence plot 500 in terms of frequency in Hertz (Hz) along the vertical axis and azimuth position in degrees along the horizontal axis. Plot 500 indicates two sources corresponding to the generally vertically aligned locus 512*a* at about −20 degrees and the vertically aligned locus 512*b* at about +40 degrees. Plot 500 also includes misidentified or phantom source points 514*a*, 514*b*, 514*c*, 514*d*, 514*e* at other azimuths positions that correspond to frequencies where both sources have significant energy. For more than two differently located competing acoustic sources, an even more complex plot generally results.

To reduce the occurrence of phantom information in the 2-D coincidence plot data, localization operator 460 integrates over time and frequency. When the signals are not correlated at each frequency, the mutual interference between the signals can be gradually attenuated by the temporal integration. This approach averages the locations of the coincidences, not the value of the function used to determine the minima, which is equivalent to applying a Kronecker delta function, $\delta(i-i_n(m))$ to $\delta_n^{(i)}(m)$ and averaging the $\delta(i-i_n(m))$ over time. In turn, the coincidence loci corresponding to the true position of the sources are enhanced. Integration over time applies a forgetting average to the 2-D coincidence plots acquired over a predetermined set of transform time frames from n=1, . . . , N; and is expressed by the summation approximation of equation (28) as follows:

$$P_N(\theta_i, m) = \sum_{n=1}^{N} \beta^{N-n}\delta(I - i_n(m)), \quad i = 1, \ldots, I; \quad m = 1, \ldots, M/2, \tag{28}$$

where, $0<\beta<1$ is a weighting coefficient which exponentially de-emphasizes (or forgets) the effect of previous coincidence results, δ(•) is the Kronecker delta fuinction, $\theta_i$ represents the position along the dual delay-lines 342 corresponding to spatial azimuth $\theta_1$ [equation (2)], and N refers to the current time frame. To reduce the cluttering effect due to instantaneous interactions of the acoustic sources, the results of equation (28) are tested in accordance with the relationship defined by equation (29) as follows:

$$P_N(\theta_i, m) = \begin{cases} P_N(\theta_i, m), & P_N(\theta_i, m) \geq \Gamma \\ 0, & \text{otherwise.} \end{cases} \tag{29}$$

where $\Gamma \geqq 0$, is an empirically determined threshold. While this approach assumes the inter-sensor delays are independent of frequency, it has been found that departures from this assumption may generally be considered negligible.

By integrating the coincidence plots across frequency, a more robust and reliable indication of the locations of sources in space is obtained. Integration of $P_n(\theta_i,m)$ over frequency produces a localization pattern which is a function of azimuth. Two techniques to estimate the true position of the acoustic sources may be utilized. The first estimation technique is solely based on the straight vertical traces across frequency that correspond to different azimuths. For this technique, $\theta_d$ denotes the azimuth with which the integration is associated, such that $\theta_d=\theta_i$, and results in the summation over frequency of equation (30) as follows:

$$H_N(\theta_d) = \sum_m P_N(\theta_d, m), \quad d = 1, \ldots, I. \tag{30}$$

where, equation (30) approximates integration over time.

The peaks in $H_n(\theta_d)$ represent the source azimuth positions. If there are Q sources, Q peaks in $H_N(\theta_d)$ may generally be expected. When compared with the patterns $\delta(i-i_n(m))$ at each frequency, not only is the accuracy of localization enhanced when more than one sound source is present, but also almost immediate localization of multiple sources for the current frame is possible. Furthermore, although a dominant source usually has a higher peak in $H_N(\theta_d)$ than do weaker sources, the height of a peak in $H_N(\theta_d)$ only indirectly reflects the energy of the sound source. Rather, the height is influenced by several factors such as the energy of the signal component corresponding to $\theta_d$ relative to the energy of the other signal components for each frequency band, the number of frequency bands, and the duration over which the signal is dominant. In fact, each frequency is weighted equally in equation (28). As a result, masking of weaker sources by a dominant source is reduced. In contrast, existing time-domain cross-correlation methods incorporate the signal intensity, more heavily biasing sensitivity to the dominant source.

Notably, the interaural time difference is ambiguous for high frequency sounds where the acoustic wavelengths are less than the separation distance D between sensors 22, 24.

This ambiguity arises from the occurrence of phase multiples above this inter-sensor distance related frequency, such that a particular phase difference $\Delta\Phi$ cannot be distinguished from $\Delta\Phi+2\pi$. As a result, there is not a one-to-one relationship of position versus frequency above a certain frequency. Thus, in addition to the primary vertical trace corresponding to $\theta_d=\theta_i$, there are also secondary relationships that characterize the variation of position with frequency for each ambiguous phase multiple. These secondary relationships are taken into account for the second estimation technique for integrating over frequency. Equation (31) provides a means to determine a predictive coincidence pattern for a given azimuth that accounts for these secondary relationships as follows:

$$\sin\theta_i - \sin\theta_d = \frac{\gamma_{m,d}}{ITD_{\max} f_m}, \tag{31}$$

where the parameter $\gamma_{m,d}$ is an integer, and each value of $\gamma_{m,d}$ defines a contour in the pattern $P_N(\theta_i,m)$. The primary relationship is associated with $\gamma_{m,d}=0$. For a specific $\theta_d$, the range of valid $\gamma_{m,d}$ is given by equation (32) as follows:

$$-ITD_{max}f_m(1+\sin\theta_d)\leq\gamma_{m,d}\leq ITD_{max}f_m(1-\sin\theta_d) \tag{32}$$

Figure 18:
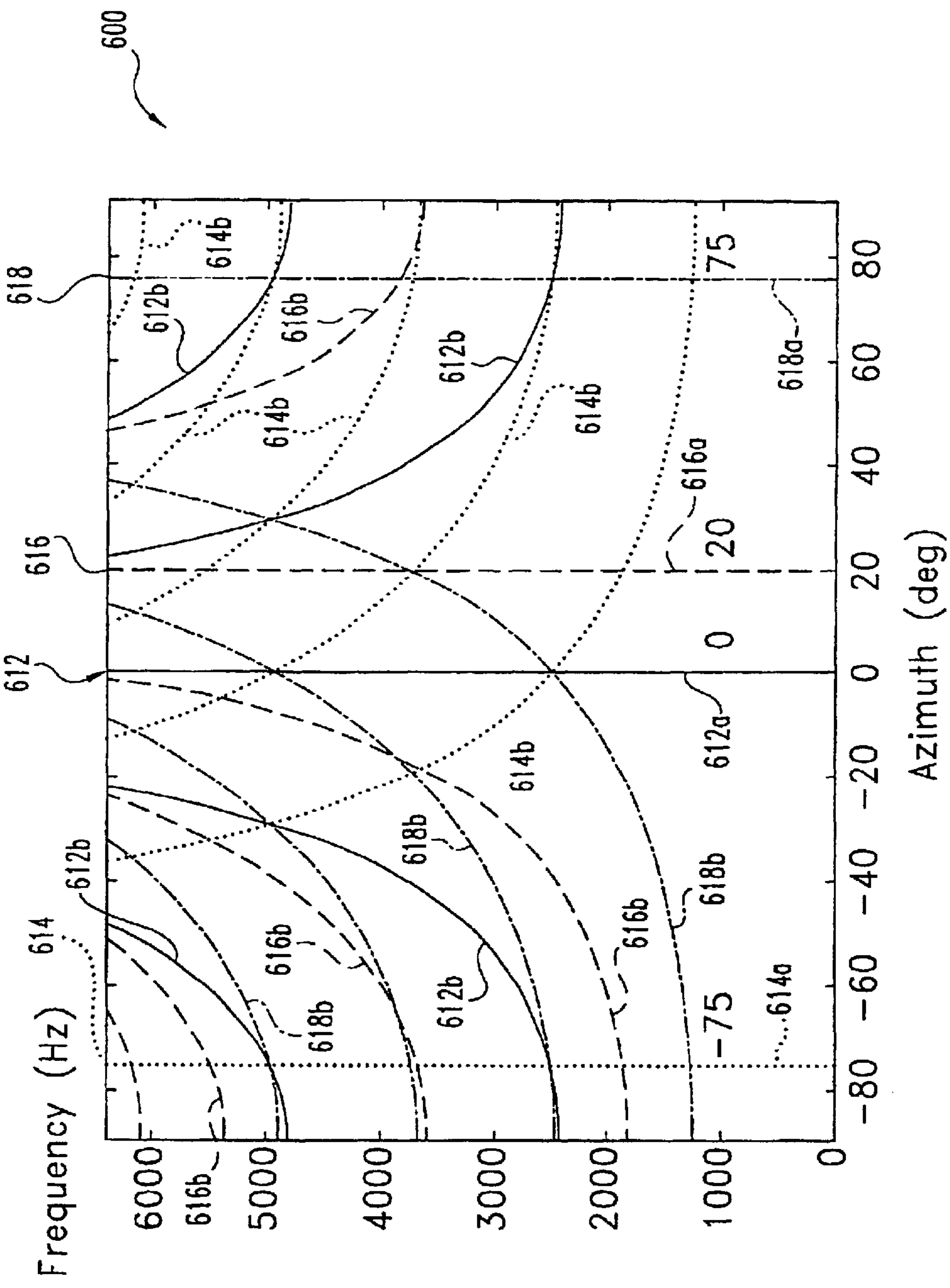
FIG. 18 is a graph illustrating coincidence patterns for azimuth positions corresponding to −75°, 0°, 20°, and 75°.

The graph 600 of FIG. 18 illustrates a number of representative coincidence patterns 612, 614, 616, 618 determined in accordance with equations (31) and (32); where the vertical axis represents frequency in Hz and the horizontal axis represents azimuth position in degrees. Pattern 612 corresponds to the azimuth position of 0°. Pattern 612 has a primary relationship corresponding to the generally straight, solid vertical line 612*a* and a number of secondary relationships corresponding to curved solid line segments 612*b*. Similarly, patterns 614, 616, 618 correspond to azimuth positions of −75°, 20°, and 75° and have primary relationships shown as straight vertical lines 614*a*, 616*a*, 618*a* and secondary relationships shown as curved line segments 614*b*, 616*b*, 618*b*, in correspondingly different broken line formats. In general, the vertical lines are designated primary contours and the curved line segments are designated secondary contours. Coincidence patterns for other azimuth positions may be determined with equations (31) and (32) as would occur to those skilled in the art.

Notably, the existence of these ambiguities in $P_N(\theta_i,m)$ may generate artifactual peaks in $H_N(\theta_d)$ after integration along $\theta_d=\theta_i$. Superposition of the curved traces corresponding to several sources may induce a noisier $H_N(\theta_d)$ term. When far away from the peaks of any real sources, the artifact peaks may erroneously indicate the detection of nonexistent sources; however, when close to the peaks corresponding to true sources, they may affect both the detection and localization of peaks of real sources in $H_N(\theta_d)$. When it is desired to reduce the adverse impact of phase ambiguity, localization may take into account the secondary relationships in addition to the primary relationship for each given azimuth position. Thus, a coincidence pattern for each azimuthal direction $\theta_d$ (d=1, . . . , I) of interest may be determined and plotted that may be utilized as a "stencil" window having a shape defined by $P_N(\theta_i,m)$ (i=1, . . . , I; m=1, . . . , M). In other words, each stencil is a predictive pattern of the coincidence points attributable to an acoustic source at the azimuth position of the primary contour, including phantom loci corresponding to other azimuth positions as a factor of frequency. The stencil pattern may be used to filter the data at different values of m.

By employing the equation (32), the integration approximation of equation (30) is modified as reflected in the following equation (33):

$$H_N(\theta_d) = \frac{1}{A(\theta_d)}\sum_m P_N\left[\sin^{-1}\left(\frac{\gamma_{m,d}}{ITD_{\max} f_m} + \sin\theta_d\right), m\right], \tag{33}$$

$$d = 1, \ldots , I,$$

where $A(\theta_d)$ denotes the number of points involved in the summation. Notably, equation (30) is a special case of equation (33) corresponding to $\gamma_{m,d}=0$. Thus, equation (33) is used in place of equation (30) when the second technique of integration over frequency is desired.

As shown in equation (2), both variables $\theta_i$ and $\tau_i$ are equivalent and represent the position in the dual delay-line. The difference between these variables is that $\theta_i$ indicates location along the dual delay-line by using its corresponding spatial azimuth, whereas $\tau_i$ denotes location by using the corresponding time-delay unit of value $\tau_i$. Therefore, the stencil pattern becomes much simpler if the stencil filter fuinction is expressed with $\tau_i$ as defined in the following equation (34):

$$\tau_i - \tau_d = \frac{\gamma_{m,d}}{2f_m}, \tag{34}$$

where, $\tau_d$ relates to $\theta_d$ through equation (4). For a specific $\tau_d$, the range of valid $\gamma_{m,d}$ is given by equation (35) as follows:

$$-(+ITD_{max}/2+\tau_d)f_m\leq\gamma_{m,d}\leq(ITD_{max}/2-\tau_d)f_m,\ \gamma_{m,d}\text{ is an integer.} \tag{35}$$

Changing value of $\tau_d$ only shifts the coincidence pattern (or stencil pattern) along the $\tau_i$-axis without changing its shape. The approach characterized by equations (34) and (35) may be utilized as an alternative to separate patterns for each azimuth position of interest; however, because the scaling of the delay units $\tau_i$ is uniform along the dual delay-line, azimuthal partitioning by the dual delay-line is not uniform, with the regions close to the median plane having higher azimuthal resolution. On the other hand, in order to obtain an equivalent resolution in azimuth, using a uniform $\tau_i$ would require a much larger I of delay units than using a uniform $\theta_i$.

Figure 16:
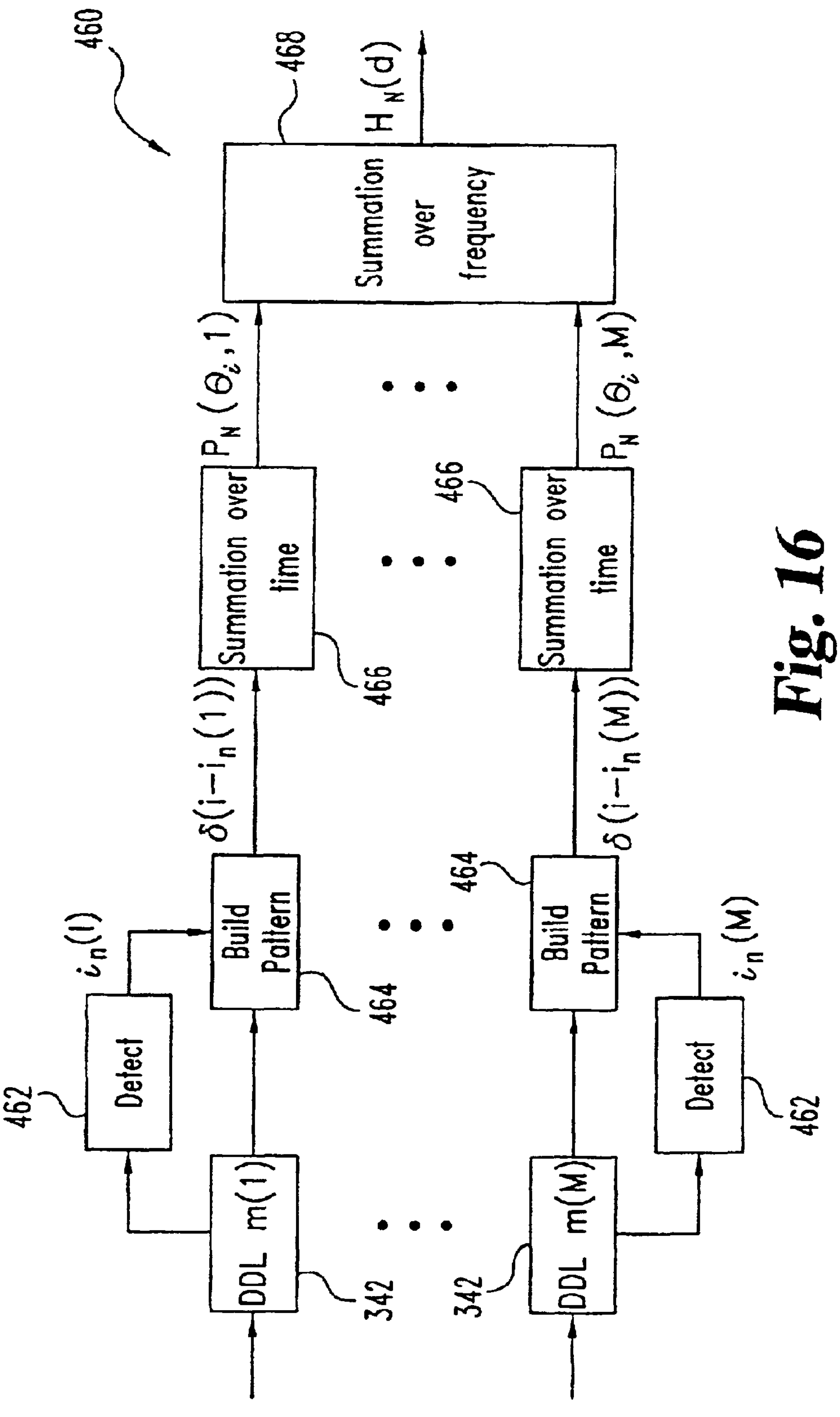
FIG. 16 is a signal flow diagram illustrating selected aspects of the localization operator of FIG. 15 in greater detail.

The signal flow diagram of FIG. 16 further illustrates selected details concerning localization operator 460. With equalization factors $\alpha_i(m)$ set to unity, the delayed signal of pairs of delay stages 344 are sent to coincidence detection operators 462 for each frequency indexed to m to determine the coincidence points. Detection operators 462 determine the minima in accordance with equation (22) or (26). Each coincidence detection operator 462 sends the results $i_n(m)$ to a corresponding pattern generator 464 for the given m. Generators 464 build a 2-D coincidence plot for each frequency indexed to m and pass the results to a corresponding summation operator 466 to perform the operation expressed in equation (28) for that given frequency. Summation operators 466 approximate integration over time. In FIG. 16, only operators 462, 464, and 466 corresponding to m=1 and m=M are illustrated to preserve clarity, with those corresponding to m=2 through m=M−1 being represented by ellipses.

Summation operators 466 pass results to summation operator 468 to approximate integration over frequency. Operators 468 may be configured in accordance with equation (30) if artifacts resulting from the secondary relationships at high frequencies are not present or may be ignored. Alternatively, stencil filtering with predictive coincidence patterns that include the secondary relationships may be performed by applying equation (33) with summation operator 468.

Referring back to FIG. 15, operator 468 outputs $H_N(\theta_d)$ to output device 490 to map corresponding acoustic source positional information. Device 490 preferably includes a display or printer capable of providing a map representative of the spatial arrangement of the acoustic sources relative to the predetermined azimuth positions. In addition, the acoustic sources may be localized and tracked dynamically as they move in space. Movement trajectories may be estimated from the sets of locations $\delta(i-i_n(m))$ computed at each sample window n. For other embodiments incorporating system 410 into a small portable unit, such as a hearing aid, output device 490 is preferably not included. In still other embodiments, output device 90 may not be included.

The localization techniques of localization operator 460 are particularly suited to localize more than two acoustic sources of comparable sound pressure levels and frequency ranges, and need not specify an on-axis desired source. As such, the localization techniques of system 410 provide independent capabilities to localize and map more than two acoustic sources relative to a number of positions as defined with respect to sensors 22, 24. However, in other embodiments, the localization capability of localization operator 460 may also be utilized in conjunction with a designated reference source to perform extraction and noise suppression. Indeed, extraction operator 480 of the illustrated embodiment incorporates such features as more fully described hereinafter.

Existing systems based on a two sensor detection arrangement generally only attempt to suppress noise attributed to the most dominant interfering source through beamforming. Unfortunately, this approach is of limited value when there are a number of comparable interfering sources at proximal locations.

It has been discovered that by suppressing one or more different frequency components in each of a plurality of interfering sources after localization, it is possible to reduce the interference from the noise sources in complex acoustic environments, such as in the case of multi-talkers, in spite of the temporal and frequency overlaps between talkers. Although a given frequency component or set of components may only be suppressed in one of the interfering sources for a given time frame, the dynamic allocation of suppression of each of the frequencies among the localized interfering acoustic sources generally results in better intelligibility of the desired signal than is possible by simply nulling only the most offensive source at all frequencies.

Extraction operator 480 provides one implementation of this approach by utilizing localization information from localization operator 460 to identify Q interfering noise sources corresponding to positions other than i=s. The positions of the Q noise sources are represented by i=noise1, noise2, . . . , noiseQ. Notably, operator 480 receives the outputs of signal operator 350 as described in connection with system 310, that presents corresponding signals $X_n^{(i=noise1)}(m)$, $X_n^{(i=noise2)}(m)$, . . . , $X_n^{(i=noiseQ)}(m)$ for each frequency m. These signals include a component of the desired signal at frequency m as well as components from sources other than the one to be canceled. For the purpose of extraction and suppression, the equalization factors $\alpha_i(m)$ need not be set to unity once localization has taken place. To determine which frequency component or set of components to suppress in a particular noise source, the amplitudes $X_n^{(i=noise1)}(m)$, $X_n^{(i=noise2)}(m)$, . . . , $X_n^{(i=noiseQ)}(m)$ are calculated and compared. The minimum $X_n^{(inoise)}(m)$, is taken as output $\hat{S}_n(m)$ as defined by the following equation (36):

$$\hat{S}_n(m)=X_n^{(inoise)}(m), \tag{36}$$

where, $X^{(inoise)}(m)$ satisfies the condition expressed by equation (37) as follows:

$$|X_n^{(inoise)}(m)| = \min\{|X_n^{(i=noise1)}(m)|, |X_n^{(i=noise2)}(m)|, \ldots, |X_n^{(i=noiseQ)}(m)|, |\alpha_s(m)X_{Ln}^{(s)}(m)|\}; \tag{37}$$

for each value of m. It should be noted that, in equation (37), the original signal $\alpha_s(m)\, X_{Ln}^{(s)}(m)$ is included. The resulting beam pattern may at times amplify other less intense noise sources. When the amount of noise amplification is larger than the amount of cancellation of the most intense noise source, further conditions may be included in operator 480 to prevent changing the input signal for that frequency at that moment.

Processors 30, 330, 430 include one or more components that embody the corresponding algorithms, stages, operators, converters, generators, arrays, procedures, processes, and techniques described in the respective equations and signal flow diagrams in software, hardware, or both utilizing techniques known to those skilled in the art. Processors 30, 330, 430 may be of any type as would occur to those skilled in the art; however, it is preferred that processors 30, 330, 430 each be based on a solid-state, integrated digital signal processor with dedicated hardware to perform the necessary operations with a minimum of other components.

Systems 310, 410 may be sized and adapted for application as a hearing aide of the type described in connection with FIG. 4A. In a fuirther hearing aid embodiment, sensors application 22, 24 are sized and shaped to fit in the pinnae of a listener, and the processor algorithms are adjusted to account for shadowing caused by the head and torso. This adjustment may be provided by deriving a Head-Related-Transfer-Function (HRTF) specific to the listener or from a population average using techniques known to those skilled in the art. This function is then used to provide appropriate weightings of the dual delay stage output signals that compensate for shadowing.

In yet another embodiment, system 310, 410 are adapted to voice recognition systems of the type described in connection with FIG. 4B. In still other embodiments, systems 310, 410 may be utilized in sound source mapping applications, or as would otherwise occur to those skilled in the art.

It is contemplated that various signal flow operators, converters, functional blocks, generators, units, stages, processes, and techniques may be altered, rearranged, substituted, deleted, duplicated, combined or added as would occur to those skilled in the art without departing from the spirit of the present inventions. In one flirther embodiment, a signal processing system according to the present invention includes a first sensor configured to provide a first signal corresponding to an acoustic excitation; where this excitation includes a first acoustic signal from a first source and a second acoustic signal from a second source displaced from the first source. The system also includes a second sensor displaced from the first sensor that is configured to provide a second signal corresponding to the excitation. Further included is a processor responsive to the first and second sensor signals that has means for generating a desired signal with a spectrum representative of the first acoustic signal. This means includes a first delay line having a number of first taps to provide a number of delayed first signals and a second delay line having a number of second taps to provide a number of delayed second signals. The system also includes output means for generating a sensory output representative of the desired signal. In another embodiment, a method of signal processing includes detecting an acoustic excitation at both a first location to provide a corresponding first signal and at a second location to provide a corresponding second signal. The excitation is a composite of a desired acoustic signal from a first source and an interfering acoustic signal from a second source that is spaced apart from the first source. This method also includes spatially localizing the second source relative to the first source as a function of the first and second signals and generating a characteristic signal representative of the desired acoustic signal during performance of this localization.

EXPERIMENTAL SECTION

The following experimental results are provided as merely illustrative examples to enhance understanding of the present invention, and should not be construed to restrict or limit the scope of the present invention.

Example One

A Sun Sparc-20 workstation was programmed to emulate the signal extraction process of the present invention. One loudspeaker (L1) was used to emit a speech signal and another loudspeaker (L2) was used to emit babble noise in a semianechoic room. Two microphones of a conventional type were positioned in the room and operatively coupled to the workstation. The microphones had an inter-microphone distance of about 15 centimeters and were positioned about 3 feet from L1. L1 was aligned with the midpoint between the microphones to define a zero degree azimuth. L2 was placed at different azimuths relative to L1 approximately equidistant to the midpoint between L1 and L2.

Figure 5:
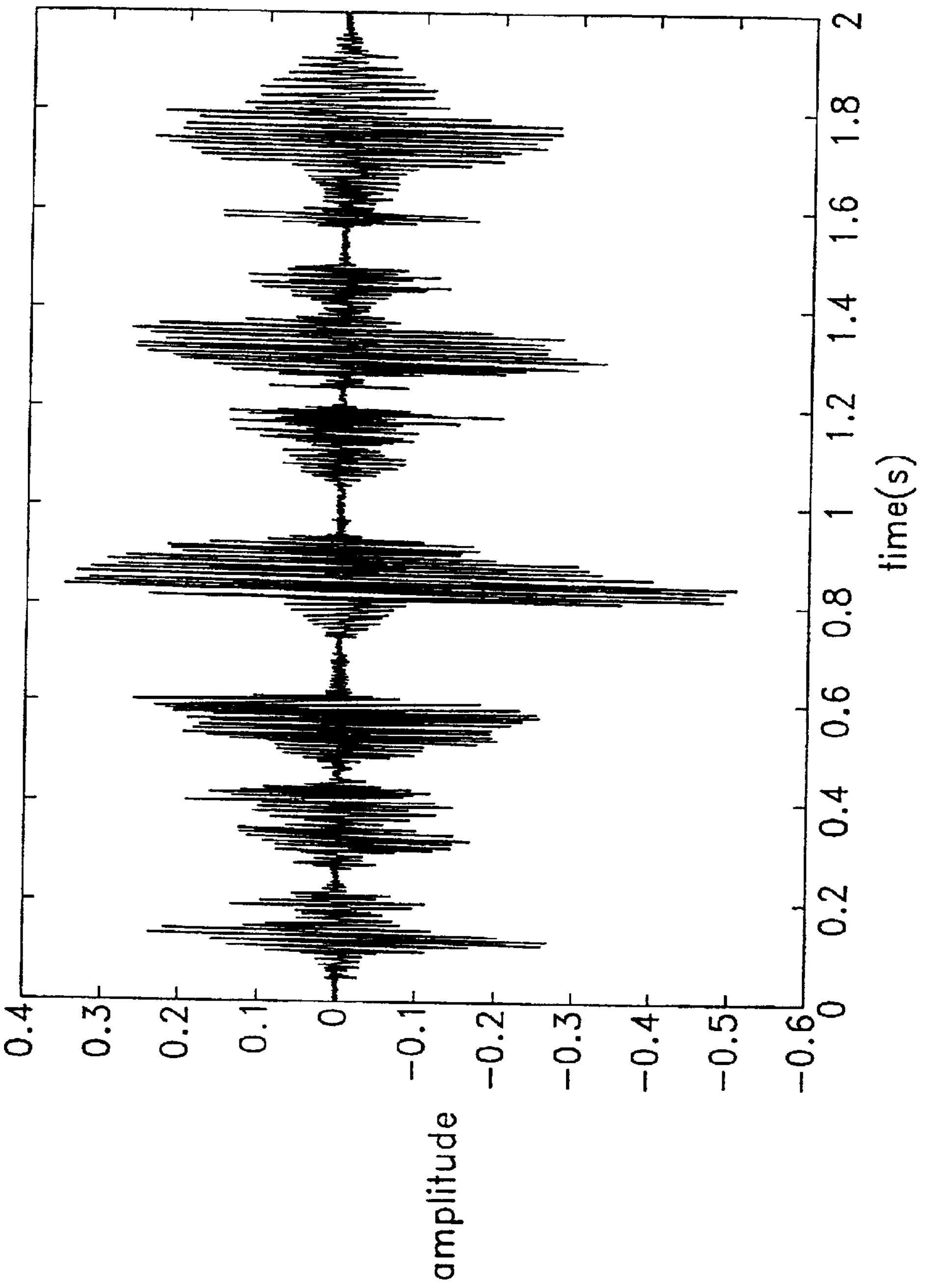
FIG. 5 is a graph of a speech signal in the form of a sentence about 2 seconds long.
Figure 6:
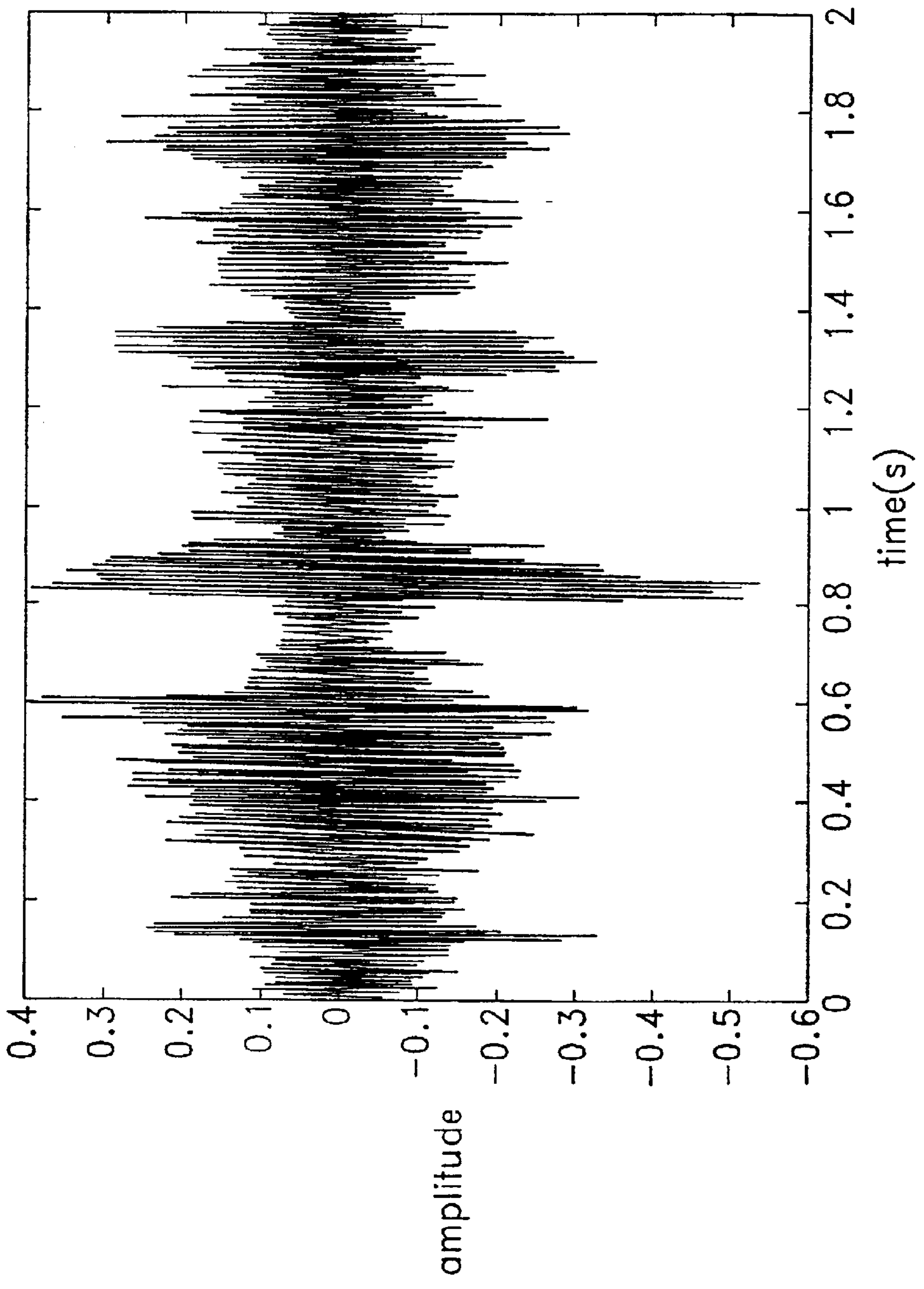
FIG. 6 is a graph of a composite signal including babble noise and the speech signal of FIG. 5 at a 0 dB signal-to-noise ratio with the babble noise source at about a 60 azimuth relative to the speech signal source.
Figure 7:
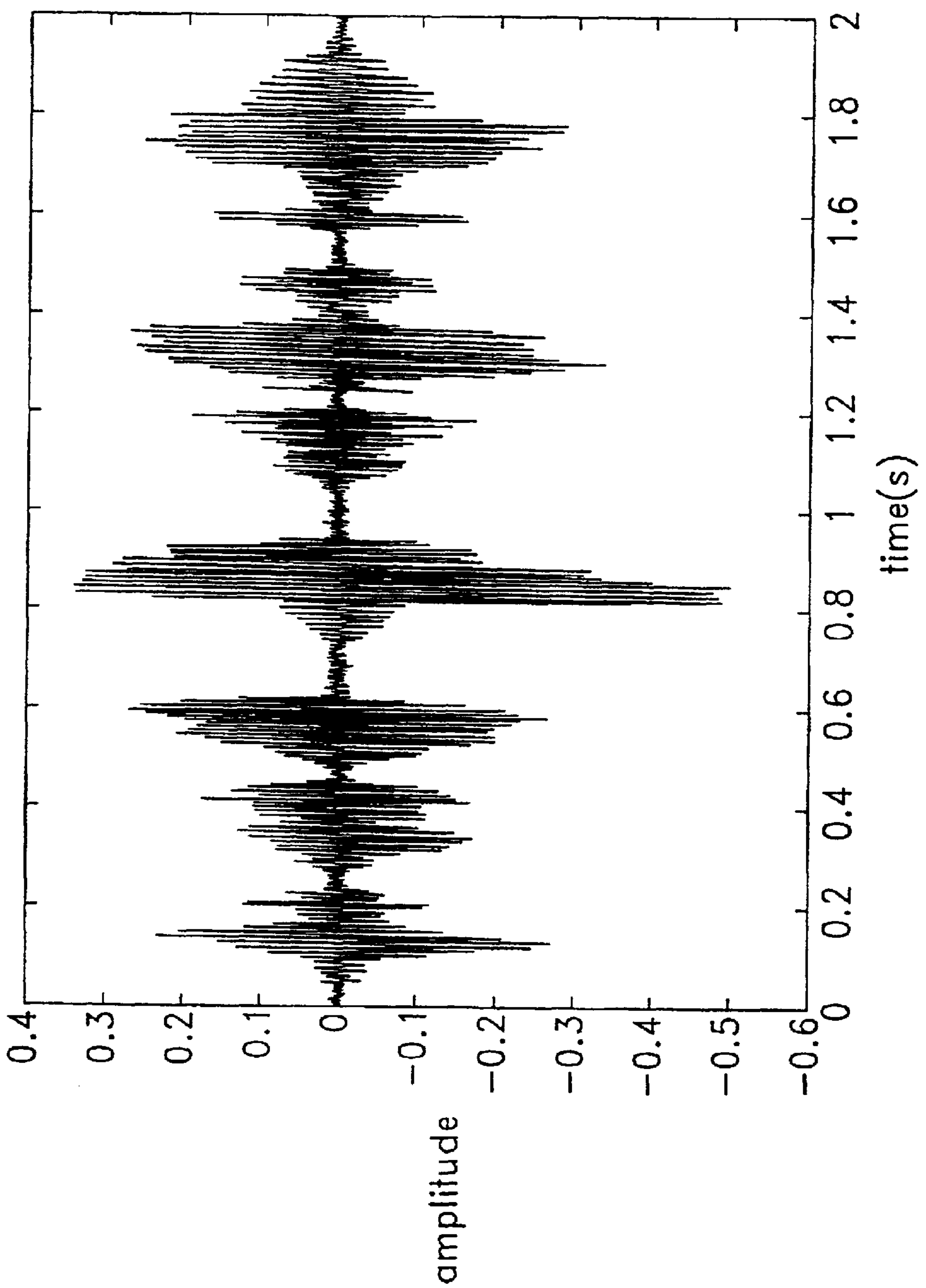
FIG. 7 is a graph of a signal representative of the speech signal of FIG. 5 after extraction from the composite signal of FIG. 6.

Referring to FIG. 5, a clean speech of a sentence about two seconds long is depicted, emanating from L1 without interference from L2. FIG. 6 depicts a composite signal from L1 and L2. The composite signal includes babble noise from L2 combined with the speech signal depicted in FIG. 5. The babble noise and speech signal are of generally equal intensity (0 dB) with L2 placed at a 60 degree azimuth relative to L1. FIG. 7 depicts the signal recovered from the composite signal of FIG. 6. This signal is nearly the same as the signal of FIG. 5.

Figure 8:
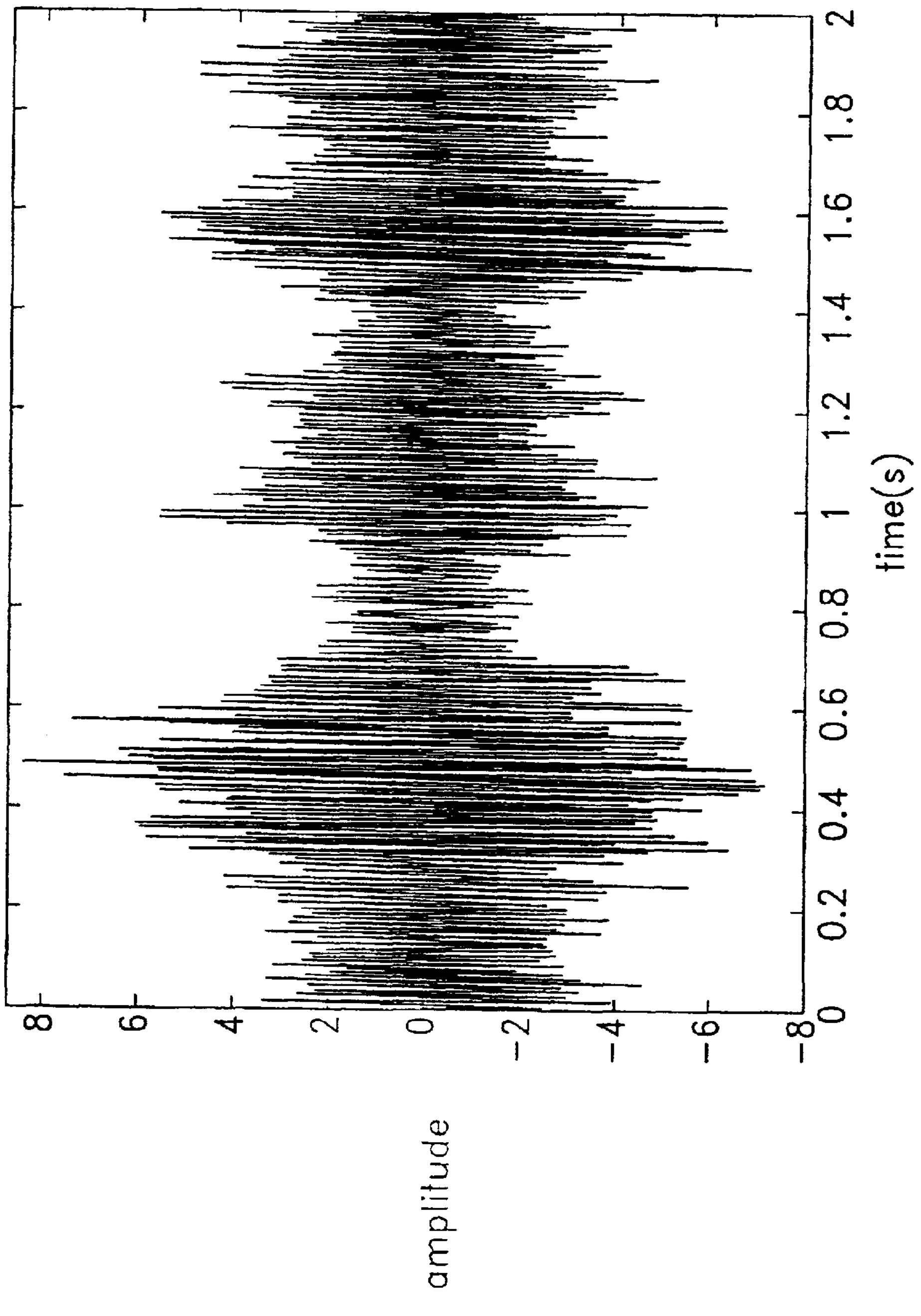
FIG. 8 is a graph of a composite signal including babble noise and the speech signal of FIG. 5 at a −30 dB signal-to-noise ratio with the babble noise source at a 2 degree azimuth relative to the speech signal source.
Figure 9:
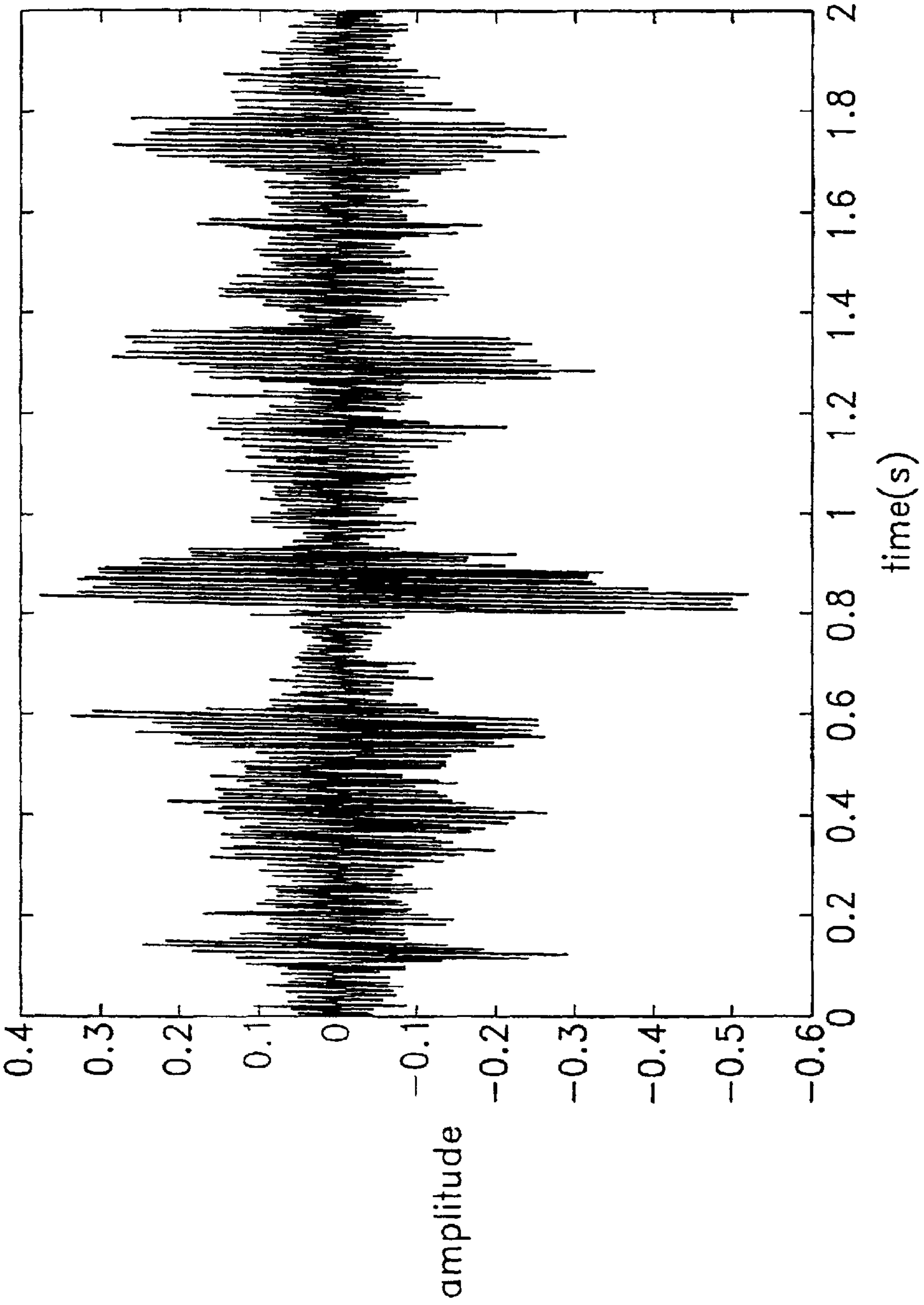
FIG. 9 is a graphic depiction of a signal representative of the sample speech signal of FIG. 5 after extraction from the composite signal of FIG. 8.

FIG. 8 depicts another composite signal where the babble noise is 30 dB more intense than the desired signal of FIG. 5. Furthermore, L2 is placed at only a 2 degree azimuth relative to L1. FIG. 9 depicts the signal recovered from the composite signal of FIG. 8, providing a clearly intelligible representation of the signal of FIG. 5 despite the greater intensity of the babble noise from L2 and the nearby location.

Example Two

Experiments corresponding to system 410 were conducted with two groups having four talkers (2 male, 2 female) in each group. Five different tests were conducted for each group with different spatial configurations of the sources in each test. The four talkers were arranged in correspondence with sources 412, 414, 416, 418 of FIG. 14 with different values for angles 412*a*, 414*a*, 416*a*, and 418*a* in each test. The illustration in FIG. 14 most closely corresponds to the first test with angle 418*a* being −75 degrees, angle 412*a* being 0 degrees, angle 414*a* being +20 degrees, and angle 416*a* being +75 degrees. The coincident patterns 612, 614, 616, and 618 of FIG. 18 also correspond to the azimuth positions of −75 degrees, 0 degrees, +20 degrees, and +75 degrees.

The experimental set-up for the tests utilized two microphones for sensors 22, 24 with an inter-microphone distance of about 144 mm. No diffraction or shadowing effect existed between the two microphones, and the inter-microphone intensity difference was set to zero for the tests. The signals were low-pass filtered at 6 kHz and sampled at a 12.8-kHz rate with 16-bit quantization. A Wintel-based computer was programmed to receive the quantized signals for processing in accordance with the present invention and output the test results described hereinafter. In the short-term spectral analysis, a 20-ms segment of signal was weighted by a Hamming window and then padded with zeros to 2048 points for DFT, and thus the frequency resolution was about 6 Hz. The values of the time delay units $\tau_i$ (i=1, . . . , I) were determined such that the azimuth resolution of the dual delay-line was 0.5° uniformly, namely I=361. The dual delay-line used in the tests was azimuth-uniform. The coincidence detection method was based on minimum magnitude differences.

Each of the five tests consisted of four subtests in which a different talker was taken as the desired source. To test the system performance under the most difficult experimental constraint, the speech materials (four equally-intense spondaic words) were intentionally aligned temporally. The speech material was presented in free-field. The localization of the talkers was done using both the equation (30) and equation (33) techniques.

The system performance was evaluated using an objective intelligibility-weighted measure, as proposed in Peterson, P. M., "*Adaptive array processing for multiple microphone hearing aids*," Ph.D. Dissertation, Dept. Elect. Eng. and Comp. Sci., MIT; Res. Lab. Elect. Tech. Rept. 541, MIT, Cambridge, Mass. (1989), and described in detail in Liu, C. and Sideman, S., "*Simulation of fixed microphone arrays for directional hearing aids*," J. Acoust. Soc. Am. 100, 848–856 (1996). Specifically, intelligibility-weighted signal cancellation, intelligibility-weighted noise cancellation, and net intelligibility-weighted gain were used.

The experimental results are presented in Tables I, II, III, and IV of FIGS. 19–22, respectively. The five tests described in Table I of FIG. 19 approximate integration over frequency by utilizing equation (30); and includes two male speakers M1, M2 and two female speakers F1, F2. The five tests described in Table II of FIG. 20 are the same as Table I, except that integration over frequency was approximated by equation (33). The five tests described in Table III of FIG. 21 approximate integration over frequency by utilizing equation (30); and includes two different male speakers M3, M4 and two different female speakers F3, F4. The five tests described in Table IV of FIG. 22 are the same as Table III, except that integration over frequency was approximated by equation (33).

For each test, the data was arranged in a matrix with the numbers on the diagonal line representing the degree of noise cancellation in dB of the desired source (ideally 0 dB) and the numbers elsewhere representing the degree of noise cancellation for each noise source. The next to the last column shows a degree of cancellation of all the noise sources lumped together, while the last column gives the net intelligibility-weighted improvement (which considers both noise cancellation and loss in the desired signal).

The results generally show cancellation in the intelligibility-weighted measure in a range of about 3~11 dB, while degradation of the desired source was generally less than about 0.1 dB). The total noise cancellation was in the range of about 8~12 dB. Comparison of the various Tables suggests very little dependence on the talker or the speech materials used in the tests. Similar results were obtained from sixtalker experiments. Generally, a 7~10 dB enhancement in the intelligibility-weighted signal-to-noise ratio resulted when there were six equally loud, temporally aligned speech sounds originating from six different loudspeakers.

All publications and patent applications cited in this specification are herein incorporated by reference as if each individual publication or patent application were specifically and individually indicated to be incorporated by reference, including, but not limited to commonly owned U.S. patent application Ser. No. 08/666,757 filed on 19 Jun. 1996 and U.S. patent application Ser. No. 08/193,158 filed on 16 Nov. 1998. Further, any theory, mechanism of operation, proof, or finding stated herein is meant to further enhance understanding of the present invention and is not intended to make the present invention or the scope of the invention as defined by the following claims in any way dependent upon such theory, mechanism of operation, proof, or finding. While the invention has been illustrated and described in detail in the drawings and foregoing description, the same is to be considered as illustrative and not restrictive in character, it being understood that only selected embodiments have been shown and described and that all changes, modifications, and equivalents that come within the spirit of the invention defined by the following claims are desired to be protected.

What is claimed is:

1. A method, comprising:

providing a first signal from a first acoustic sensor and a second signal from a second acoustic sensor spaced apart from the first acoustic sensor, the first signal and the second signal each corresponding to two or more acoustic sources, said acoustic sources including a plurality of interfering sources and a desired source;

localizing the interfering sources from the first and second signals to provide a corresponding number of interfering source signals each corresponding to a different one of the interfering sources and each including a plurality of frequency components, the components each corresponding to a different frequency; and for each of the interfering source signals, suppressing one of the frequency components, wherein the one of the frequency components suppressed for any one of the interfering source signals differs from the one of the frequency components suppressed for any other of the interfering source signals.

2. The method of claim 1, wherein said suppressing includes extracting a desired signal representative of the desired source.

3. The method of claim 2, wherein said extracting includes determining a minimum value as a function of the interfering signals.

4. The method of claim 1, wherein said localizing includes filtering with a number of coincidence patterns each corresponding to one of a number of predetermined spatial positions relative to the first and second sensors, the patterns each providing phantom position information that varies with frequency relative to the one of the predetermined spatial positions.

5. The method of claim 1, further comprising delaying the first and second signals with a different dual delay line for each of a number of frequencies to provide a corresponding number of delayed signals to perform said localizing.

6. The method of claim 5, further comprising processing the delayed signals after said localizing to perform said suppressing.

7. The method of claim 6, further comprising:

transforming the first and second signals from a time domain form to a frequency domain form in terms of the frequencies before said delaying;

extracting a desired signal representative of the desired source, said extracting including said suppressing;

transforming the desired signal from a frequency domain form to a time domain form; and generating an acoustic output representative of the desired source from the time domain form of the desired signal.

8. The method of claim 5, wherein the interfering signals are each determined from a unique pair of the delayed signals as a ratio between a difference in magnitude of the unique pair of the delayed signals and a difference determined as a function of an amount of delay associated with each member of the unique pair of the delayed signals.

9. A system, comprising:

a pair of spaced apart acoustic sensors each arranged to detect two or more differently located acoustic sources and correspondingly generate a pair of input signals, said acoustic sources including a desired source and a plurality of interfering sources;

a delay operator responsive to said input signals to generate a number of delayed signals therefrom;

a localization operator responsive to said delayed signals to localize said interfering sources relative to location of said sensors and provide a plurality of interfering source signals each representative of a corresponding one of said interfering sources, said interfering source signals each being represented in terms of a plurality of frequency components, said components each corresponding to a different frequency;

an extraction operator responsive to said interfering source signals to suppress at least one of said frequency components of each of said interfering source signals and extract a desired signal corresponding to said desired source, said at least one of said frequency components being suppressed is different for each of said interfering source signals; and an output device responsive to said desired signal to provide an output corresponding to said desired source.

10. The system of claim 9, wherein said localization operator includes a filter to localize said interfering sources relative to a number of positions, said filter being based on a different coincidence pattern of ambiguous positional information that varies with frequency for each of said positions.

11. The system of claim 9, further comprising:

an analog-to-digital converter responsive to said input signals to convert each of said input signals from an analog form to a digital form;

a first transformation stage responsive to said digital form of said input signals to transform said input signals from a time domain form to a frequency domain form in terms of a plurality of discrete frequencies, said delay operator including a dual delay line for each of the frequencies;

a second transformation stage responsive to said desired signal to transform said desired signal from a digital frequency domain form to a digital time domain form; and a digital-to-analog converter responsive to said digital time domain form to convert said desired signal to an analog output form for said output device.

12. The system of claim 9, wherein said delay operator, said localization operator, and said extraction operator are provided by a solid state signal processing device.

13. The system of claim 9, wherein said desired source signal is determined as a function of said interfering signals.

14. The system of claim 9, wherein said interfering source signals are each determined from a unique pair of said delayed signals.

15. The system of claim 14, wherein said interfering signals each correspond to a ratio between a difference in magnitude of said unique pair of said delayed signals and a difference determined as a function of an amount of delay associated with each member of said unique pair of said delayed signals.

16. The system of claim 9, wherein said output device is configured to provide an acoustic output representative of said desired source.

17. A method, comprising:

positioning a first acoustic sensor and a second acoustic sensor to detect a plurality of differently located acoustic sources;

generating a first signal corresponding to said sources with said first sensor and a second signal corresponding to said sources with said second sensor;

providing a number of delayed signal pairs from the first and second signals, the delayed signal pairs each corresponding to one of a number of positions relative to the first and second sensors; and localizing the sources as a function of the delayed signal pairs and a number of coincidence patterns, the patterns each corresponding to one of the positions and establishing an expected variation of acoustic source position information with frequency attributable to a source at the one of the positions.

18. The method of claim 17, wherein the coincidence patterns each correspond to a number of relationships characterizing a variation of phantom acoustic source position with frequency, the relationships each corresponding to a different ambiguous phase multiple.

19. The method of claim 18, further comprising determining the relationships for each of the coincidence patterns as a function of distance separating the first and second sensors.

20. The method of claim 18, wherein the relationships each correspond to a secondary contour that curves in relation to a primary contour, the primary contour representing frequency invariant acoustic source position information determined from the delayed signal pair corresponding to the one of the positions.

21. The method of claim 17, wherein said localizing includes filtering with the coincidence patterns to enhance true position information with phantom position information.

22. The method of claim 21, wherein said localizing includes integrating over time and integrating over frequency.

23. The method of claim 17, wherein the first sensor and second sensor are part of a hearing aid device and further comprising adjusting the delayed signal pairs with a head-related-transfer function.

24. The method of claim 17, further comprising:

extracting a desired signal after said localizing; and suppressing a different set of frequency components for each of a selected number of the sources to reduce noise.

25. The method of claim 17, wherein the positions each correspond to an azimuth established relative to the first and second sensors and further comprising generating a map showing relative location of each of the sources.

26. The method of claim 17, wherein the plurality of sources include a desired source and several interfering sources and further comprising:

spectrally representing each of the interfering source signals with a number of frequency components; and for each of the interfering source signals, suppressing one or more of the frequency components, wherein the one or more frequency components suppressed for any one of the interfering source signals differ from the one or more frequency components suppressed for any other of the interfering source signals.

27. A system, comprising:

a pair of spaced apart acoustic sensors each configured to generate a corresponding one of a pair of inputs signals, the signals being representative of a number of differently located acoustic sources;

a delay operator responsive to said input signals to generate a number of delayed signals each corresponding to one of a number of positions relative to said sensors;

a localization operator responsive to said delayed signals to determine a number of sound source localization signals from said delayed signals and a number of coincidence patterns, said patterns each corresponding to one of said positions and relating frequency varying sound source position information caused by ambiguous phase multiples to said one of said positions to improve sound source localization; and an output device responsive to said localization signals to provide an output corresponding to at least one of said sources.

28. The system of claim 27, further comprising:

an analog-to-digital converter responsive to said input signals to convert each of said input signals from an analog form to a digital form; and a first transformation stage responsive to said digital form of said input signals to transform said input signals from a time domain form to a frequency domain form in terms of a plurality of discrete frequencies, said delay operator including a dual delay line for each of the frequencies.

29. The system of claim 28, further comprising:

an extraction operator responsive to said localization signals to extract a desired signal;

a second transformation stage responsive to said desired signal to transform said desired signal from a digital frequency domain form to a digital time domain form; and a digital to analog converter responsive to said digital time domain form to convert said desired signal to an analog output form for said output device.

30. The system of claim 27, wherein said output device is configured to provide a map of acoustic source locations.

31. The system of claim 27, wherein said delay operator and said localization operator are defined by an integrated solid state signal processor.

32. The system of claim 27, wherein said localization operator responds to said delay signals to determine a closest one of said positions for one of said sources as a function of at least one of said delayed signals corresponding to said closest one of said positions and at least two other of said delayed signals corresponding to other of said positions, said at least two other of said delayed signals being determined with a corresponding one of said coincidence patterns.

33. A method, comprising:

providing a first signal from a first acoustic sensor and a second signal from a second acoustic sensor spaced apart from the first acoustic sensor, the first signal and the second signal each corresponding to two or more acoustic sources, said acoustic sources including a plurality of interfering sources and a desired source;

determining a number of interfering source signals each corresponding to a different one of the interfering sources;

spectrally representing each of the interfering source signals with a number of frequency components; and for each of the interfering source signals, suppressing one or more of the frequency components, wherein the one or more frequency components suppressed for any one of the interfering source signals differ from the one or more frequency components suppressed for any other of the interfering source signals.

34. The method of claim 33, wherein said suppressing includes extracting a desired signal representative of the desired source.

35. The method of claim 34, wherein said extracting includes determining a minimum value as a function of the interfering signals.

36. The method of claim 33, wherein said determining includes filtering with a number of coincidence patterns each corresponding to one of a number of predetermined spatial positions relative to the first and second sensors, the patterns each providing phantom position information that varies with frequency relative to the one of the predetermined spatial positions.

37. The method of claim 33, wherein said determining includes localizing each of the interfering sources relative to a reference axis.

38. The method of claim 37, further comprising:

transforming the first and second signals from a time domain form to a frequency domain form in terms of the frequencies before said delaying;

processing the delayed signals after said localizing to perform said suppressing;

extracting a desired signal representative of the desired source, said extracting including said suppressing;

transforming the desired signal from a frequency domain form to a time domain form; and generating an acoustic output representative of the desired source from the time domain form of the desired signal.

39. The method of claim 37, which includes delaying the first and second signals with a different dual delay line for each of a number of frequencies to provide a corresponding number of delayed signals to perform said localizing, and wherein the interfering signals are each determined from a unique pair of the delayed signals as a ratio between a difference in magnitude of the unique pair of the delayed signals and a difference determined as a function of an amount of delay associated with each member of the unique pair of the delayed signals.

* * * * *